United States Patent [19]

Chillson

[11] 3,762,670

[45] Oct. 2, 1973

[54] LANDING GEAR WHEEL DRIVE SYSTEM FOR AIRCRAFT

[75] Inventor: Charles W. Chillson, Wayne, N.J.

[73] Assignee: Curtiss-Wright Corporation, Wood-Ridge, N.J.

[22] Filed: Dec. 16, 1971

[21] Appl. No.: 208,693

[52] U.S. Cl................... 244/50, 180/66 A, 180/74
[51] Int. Cl............................................. B60k 7/00
[58] Field of Search................ 244/50, 62, 75 R, 244/2 R, 103 R, 103 S, 63, 102 R; 180/74, 66 A, 14 C, 66 R, 66 F, 53 R

[56] References Cited
UNITED STATES PATENTS

| | | | |
|---|---|---|---|
| 2,460,387 | 2/1949 | Hunter | 244/50 |
| 2,920,845 | 1/1960 | Palmiter | 244/50 X |
| 3,005,510 | 10/1961 | Phillips | 180/74 X |

FOREIGN PATENTS OR APPLICATIONS

| | | | |
|---|---|---|---|
| 698,201 | 11/1940 | Germany | 244/50 |
| 1,141,190 | 12/1962 | Germany | 180/66 A |
| 527,139 | 5/1955 | Italy | 180/66 A |

*Primary Examiner*—Milton Buchler
*Assistant Examiner*—Paul E. Sauberer
*Attorney*—Victor D. Behn et al.

[57] ABSTRACT

The invention comprises a light weight auxiliary drive mechanism carried by an aircraft for applying driving torque to wheels of a landing gear of the aircraft for taxiing the aircraft along the ground. In particular, the mechanism consists of a driving drum arranged for friction driving engagement with the tire of a wheel of a landing gear having a telescopic, shock-absorbing strut, and an auxiliary motor drivably connected to the drum, with the drum being supported on said landing gear.

29 Claims, 20 Drawing Figures

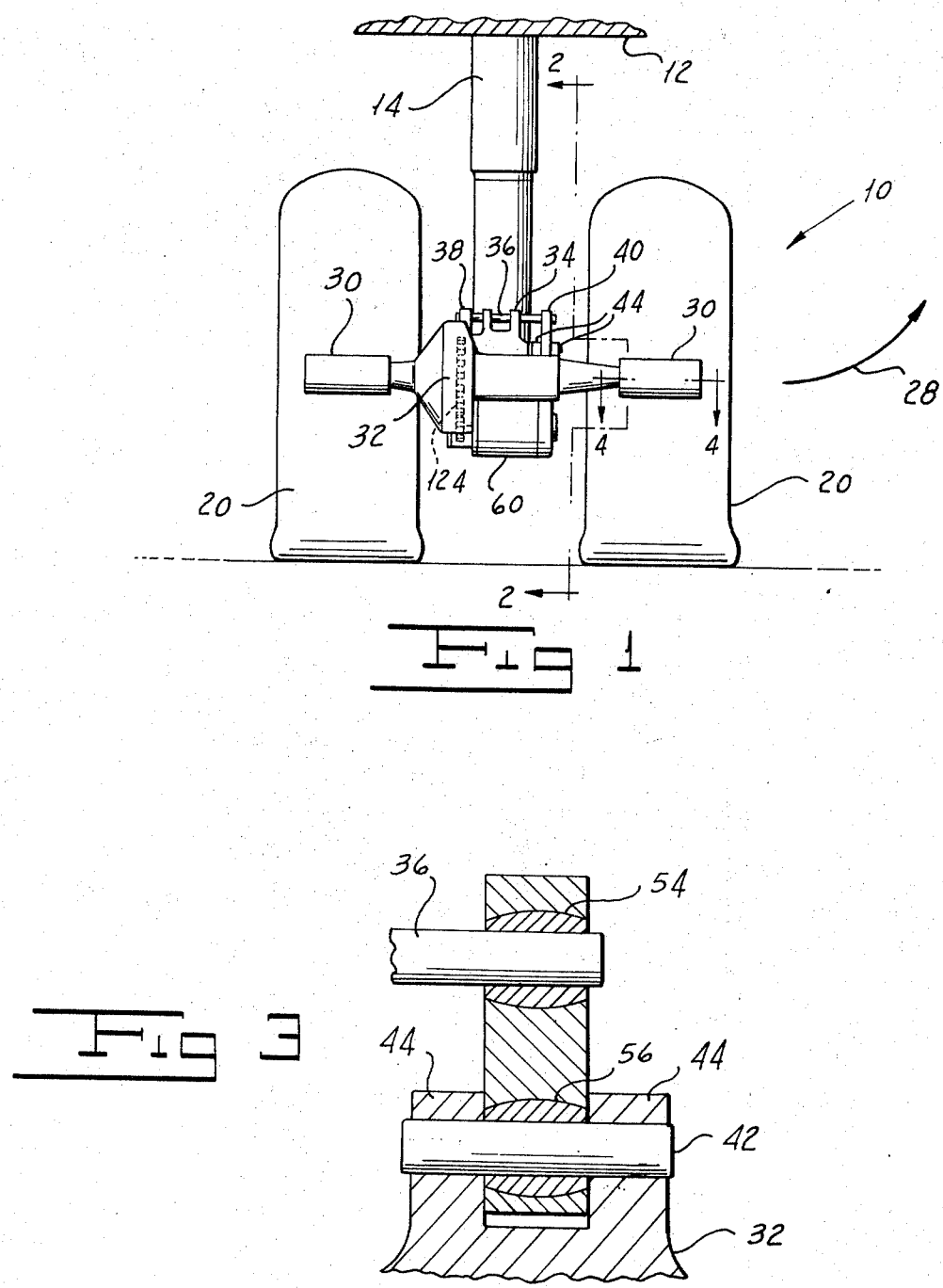

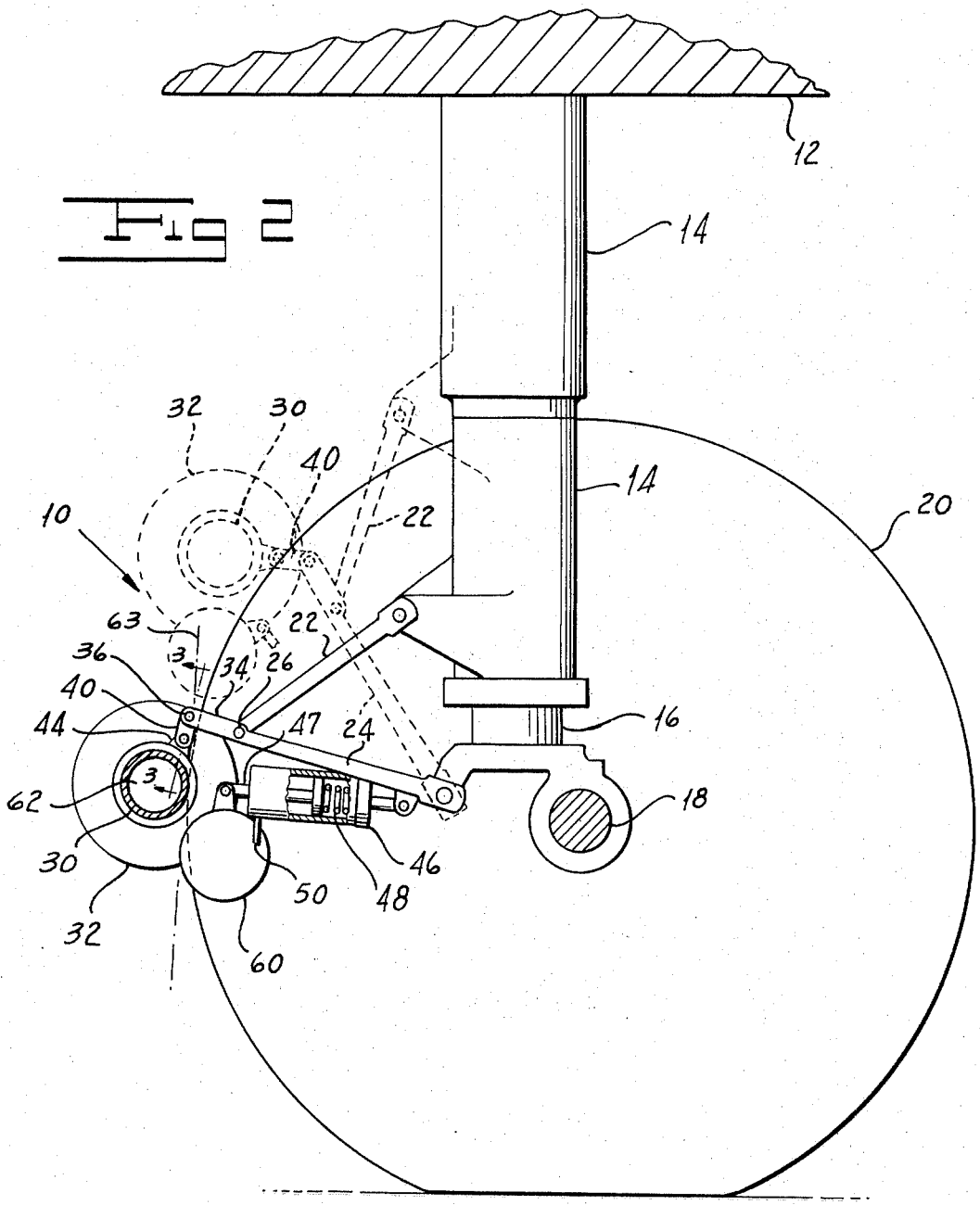

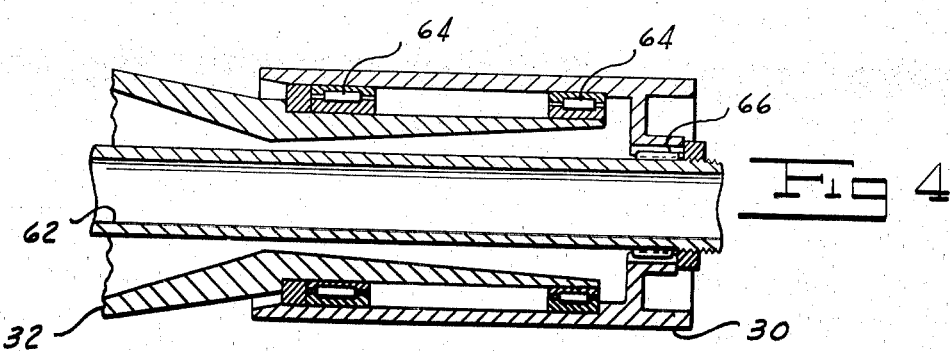
Fig 4
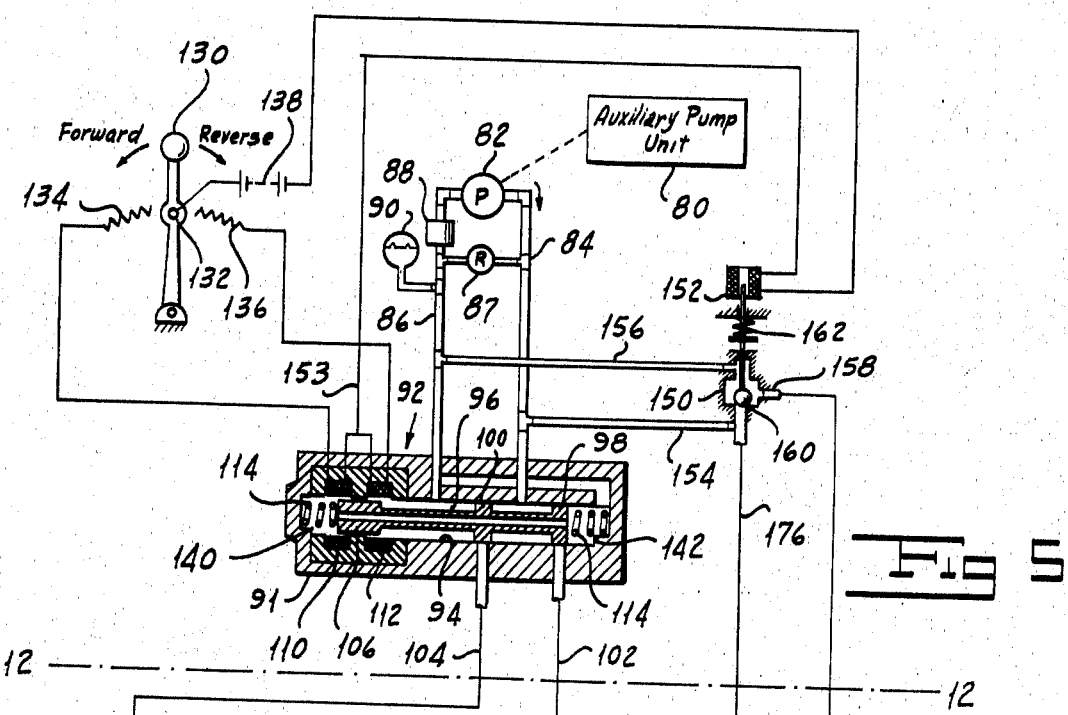
Fig 5
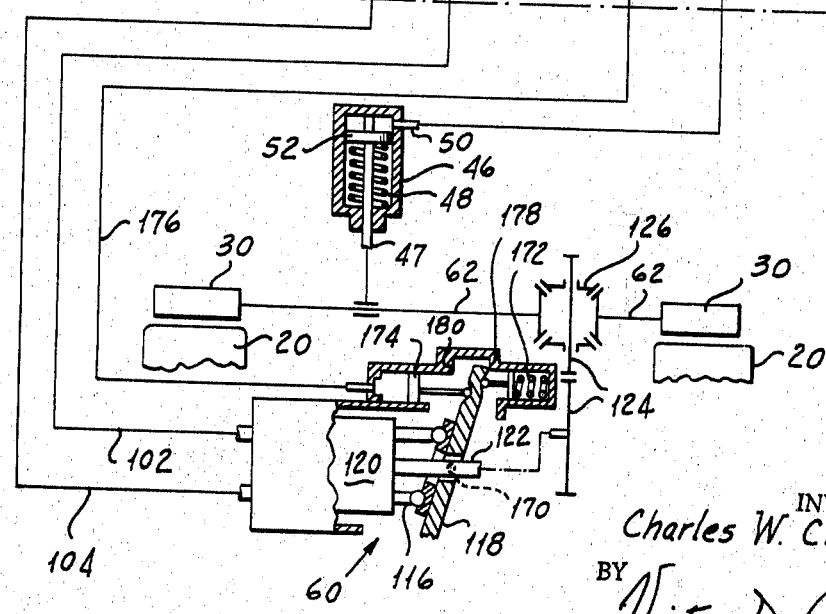
INVENTOR.
Charles W. Chillson
BY
Victor D. Behn
ATTORNEY

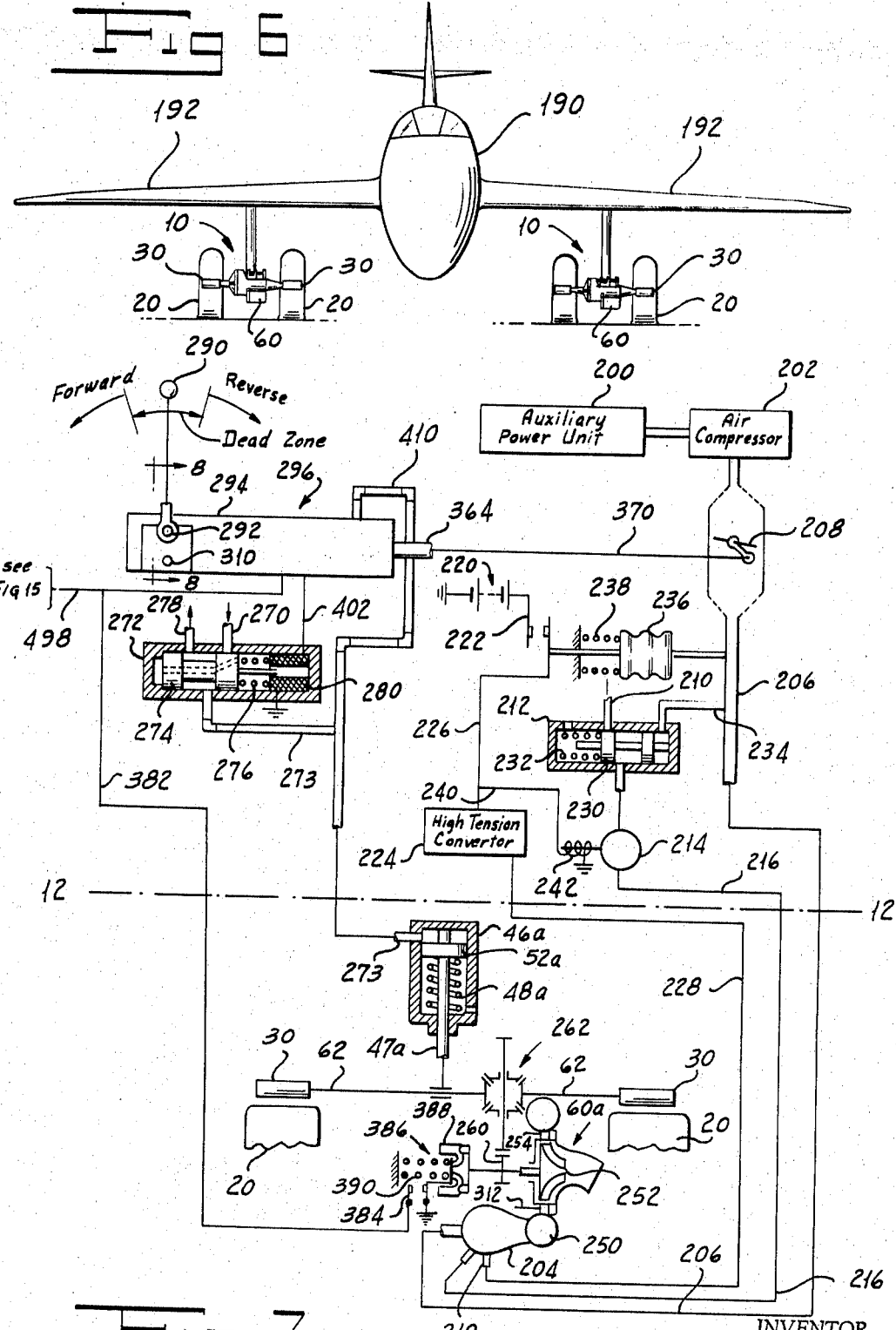

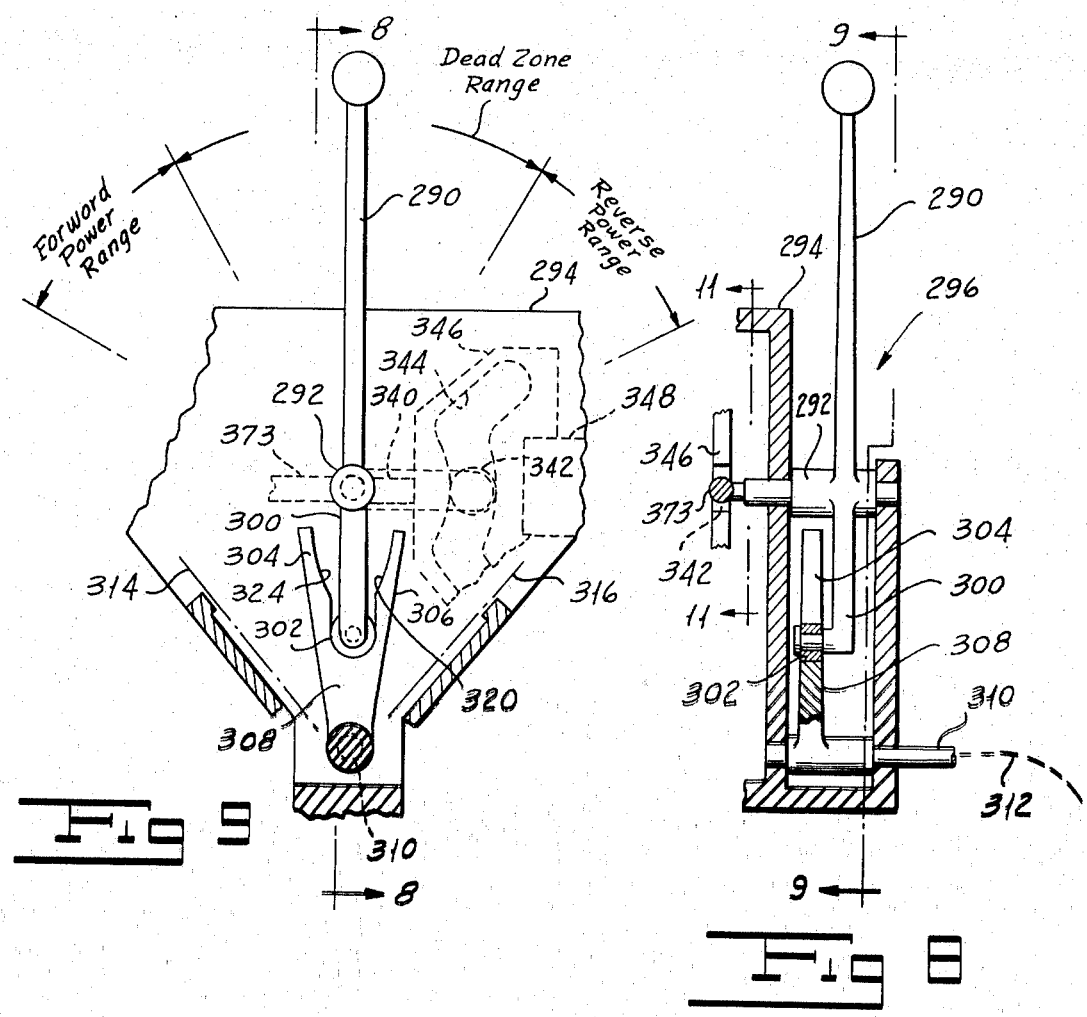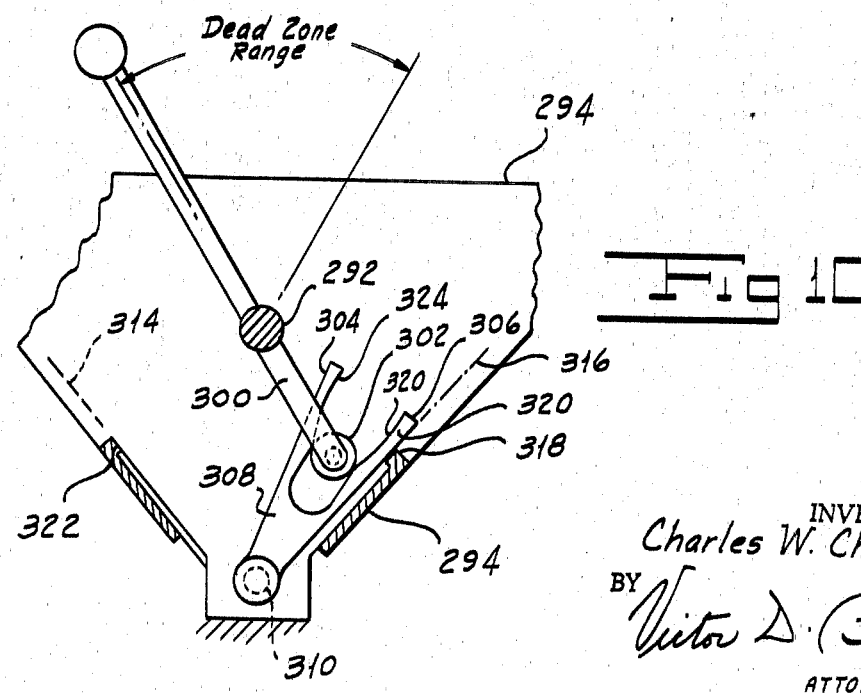

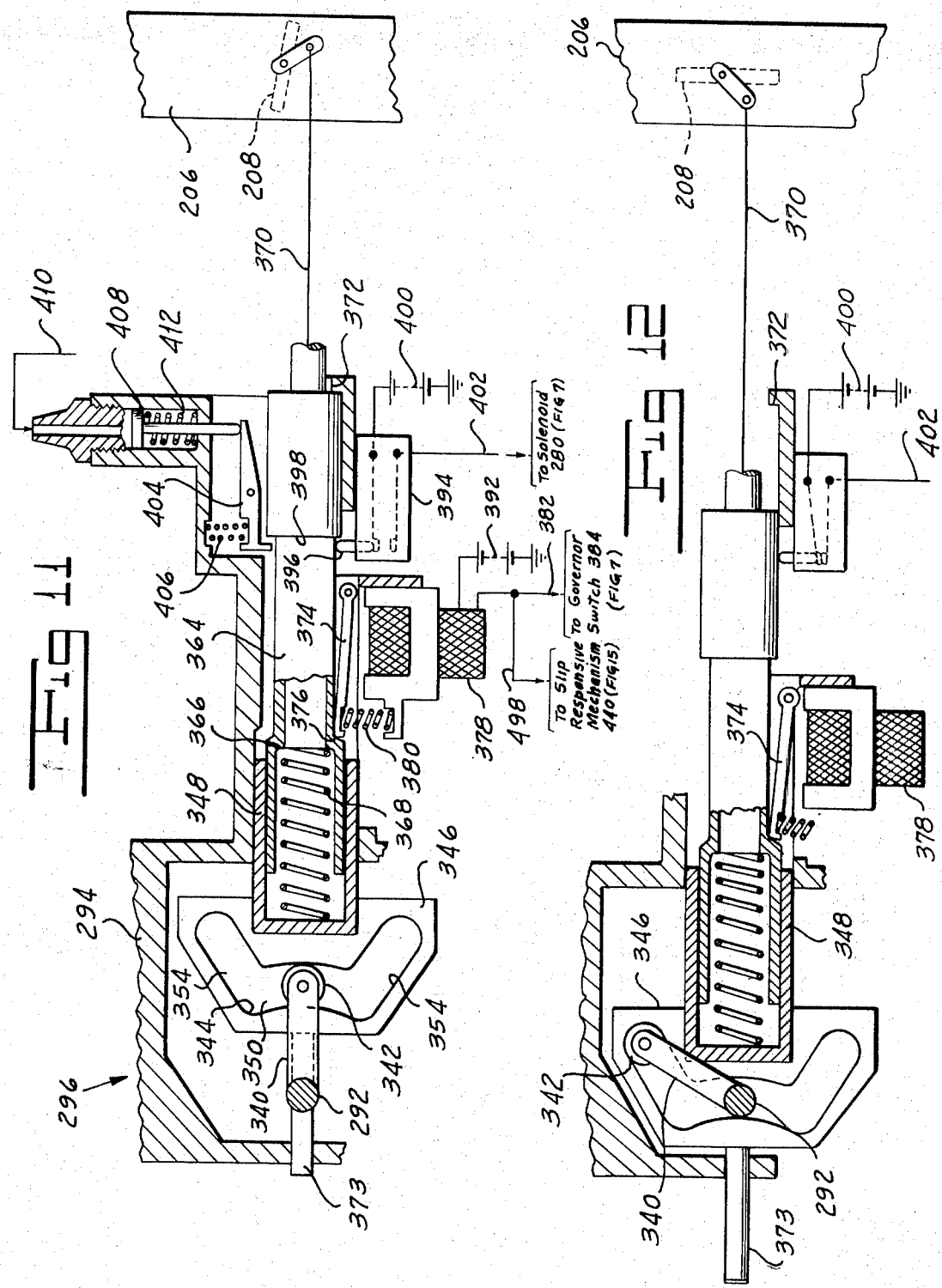

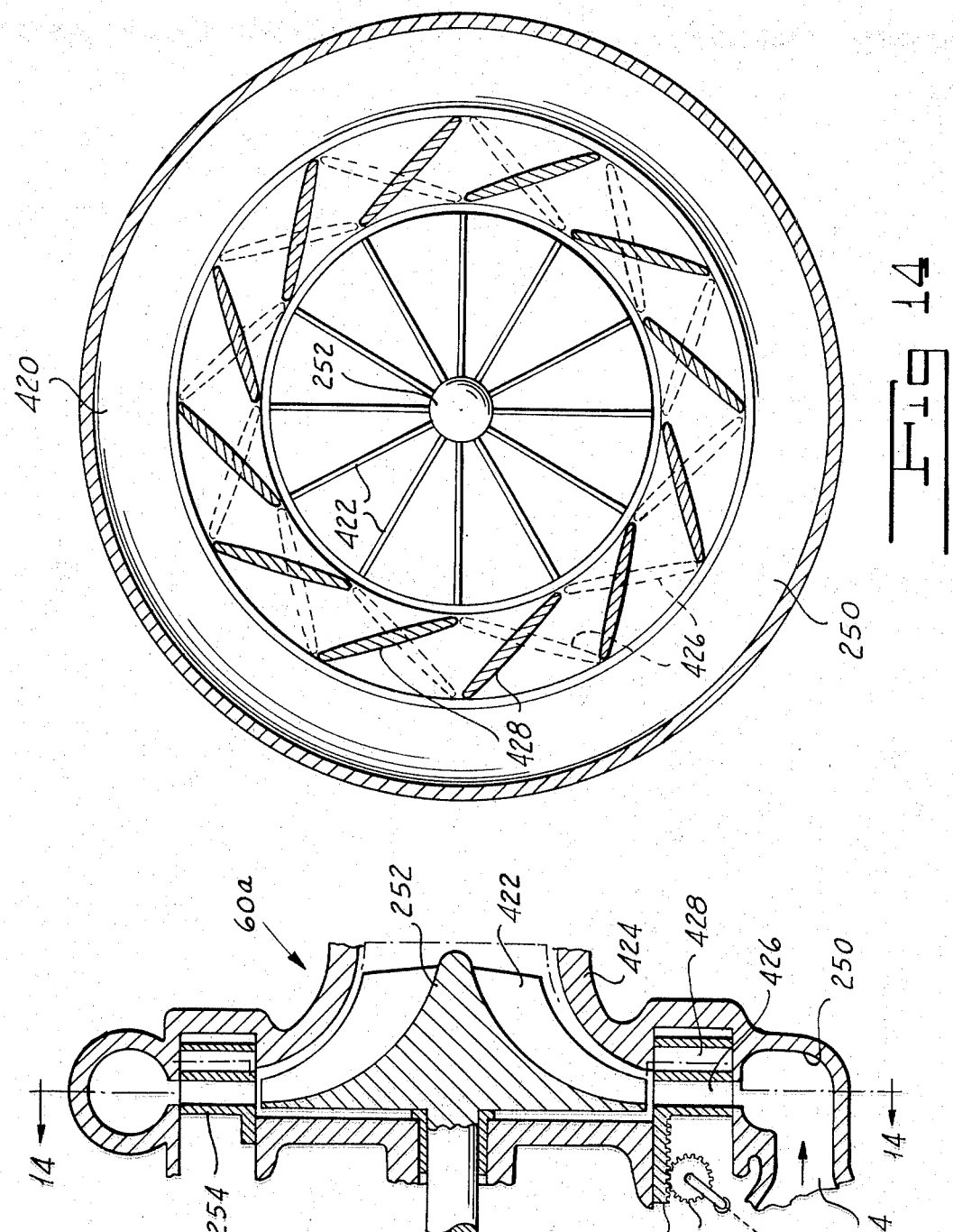

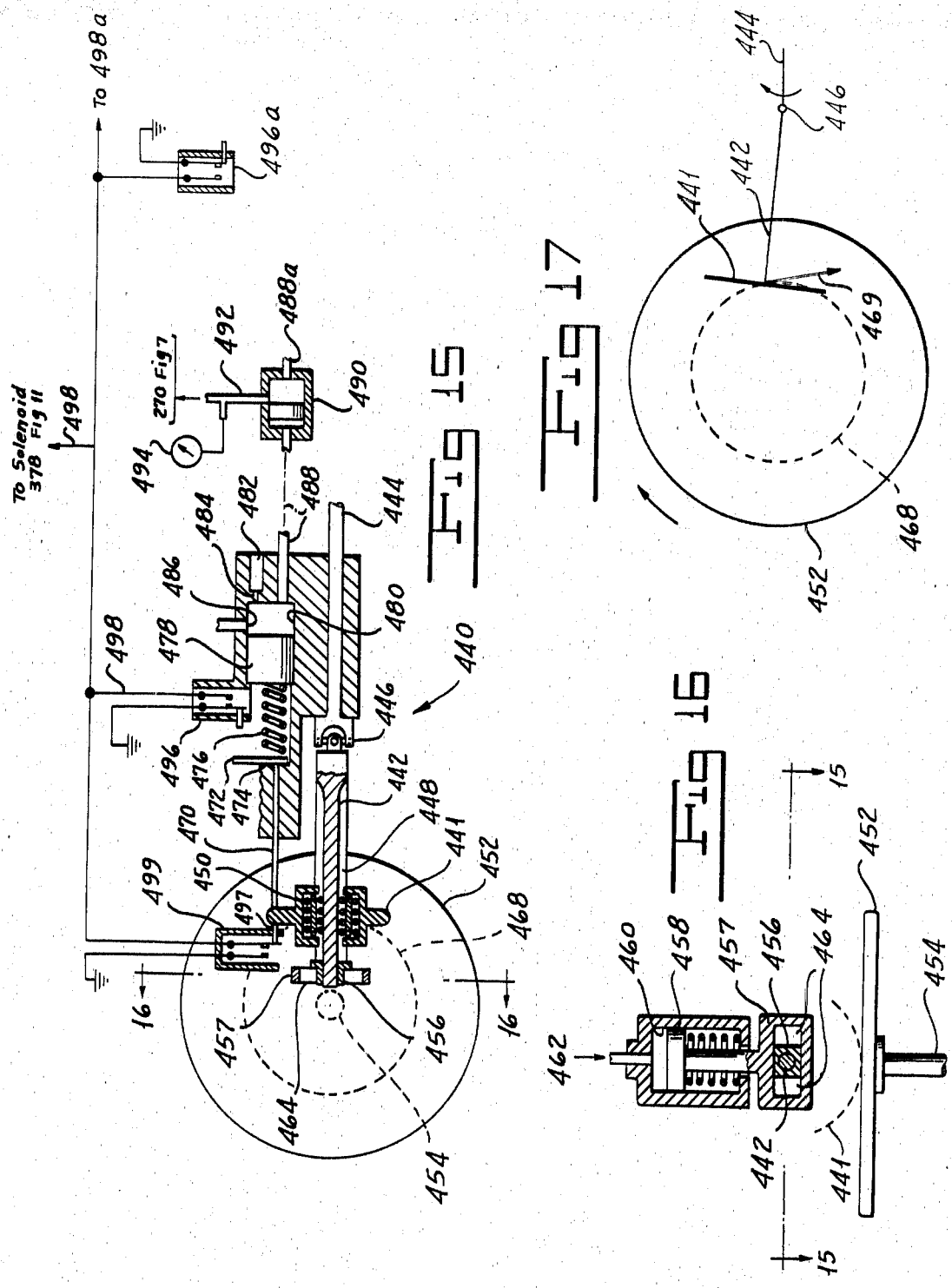

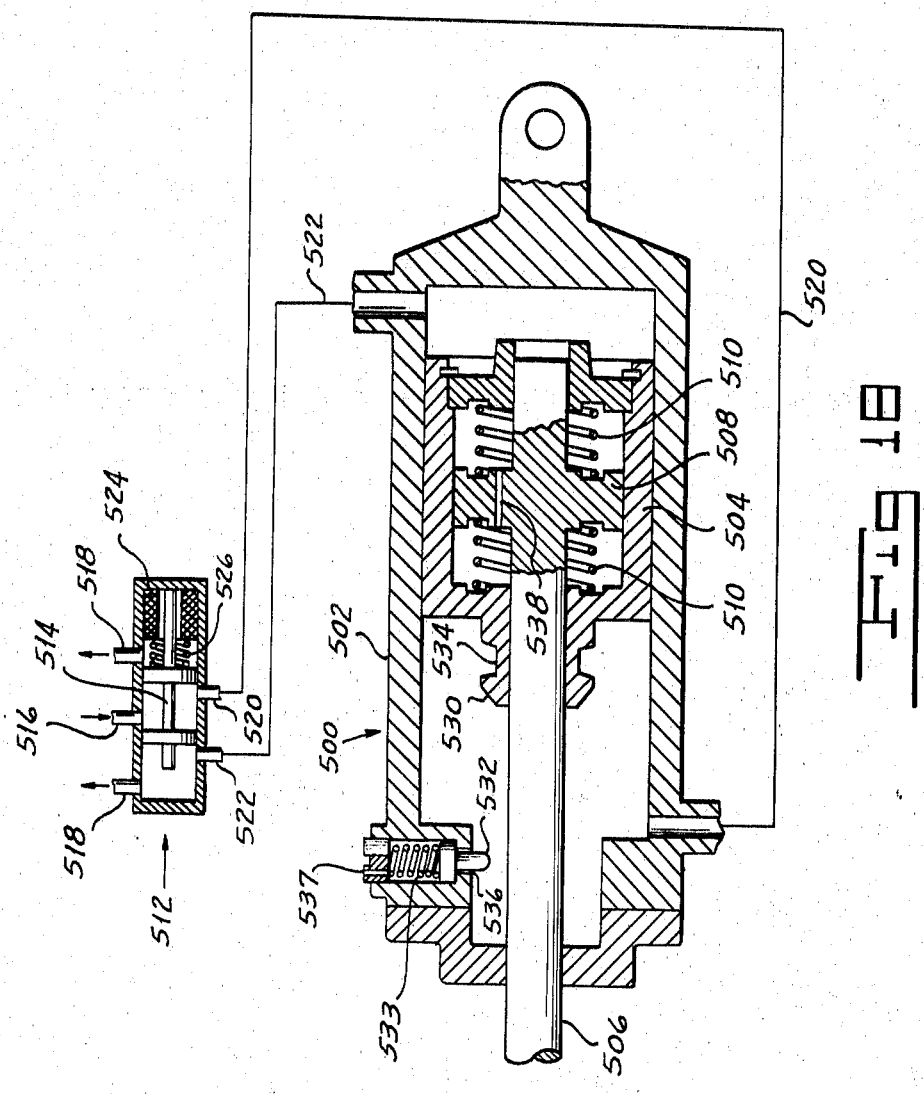

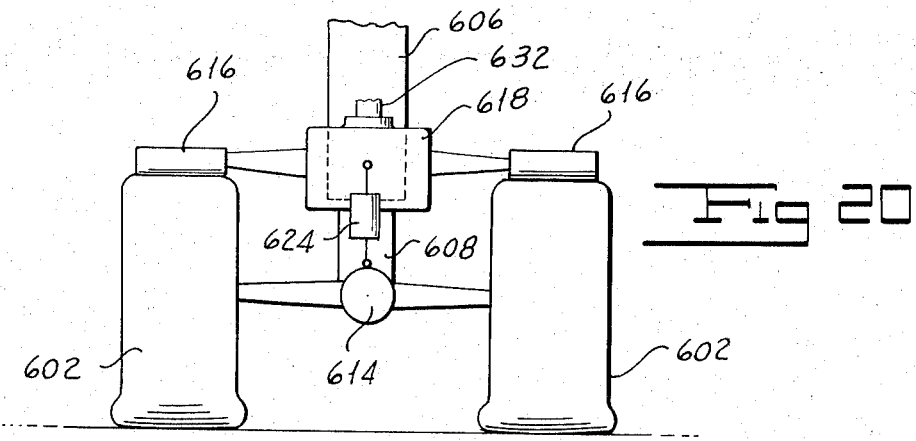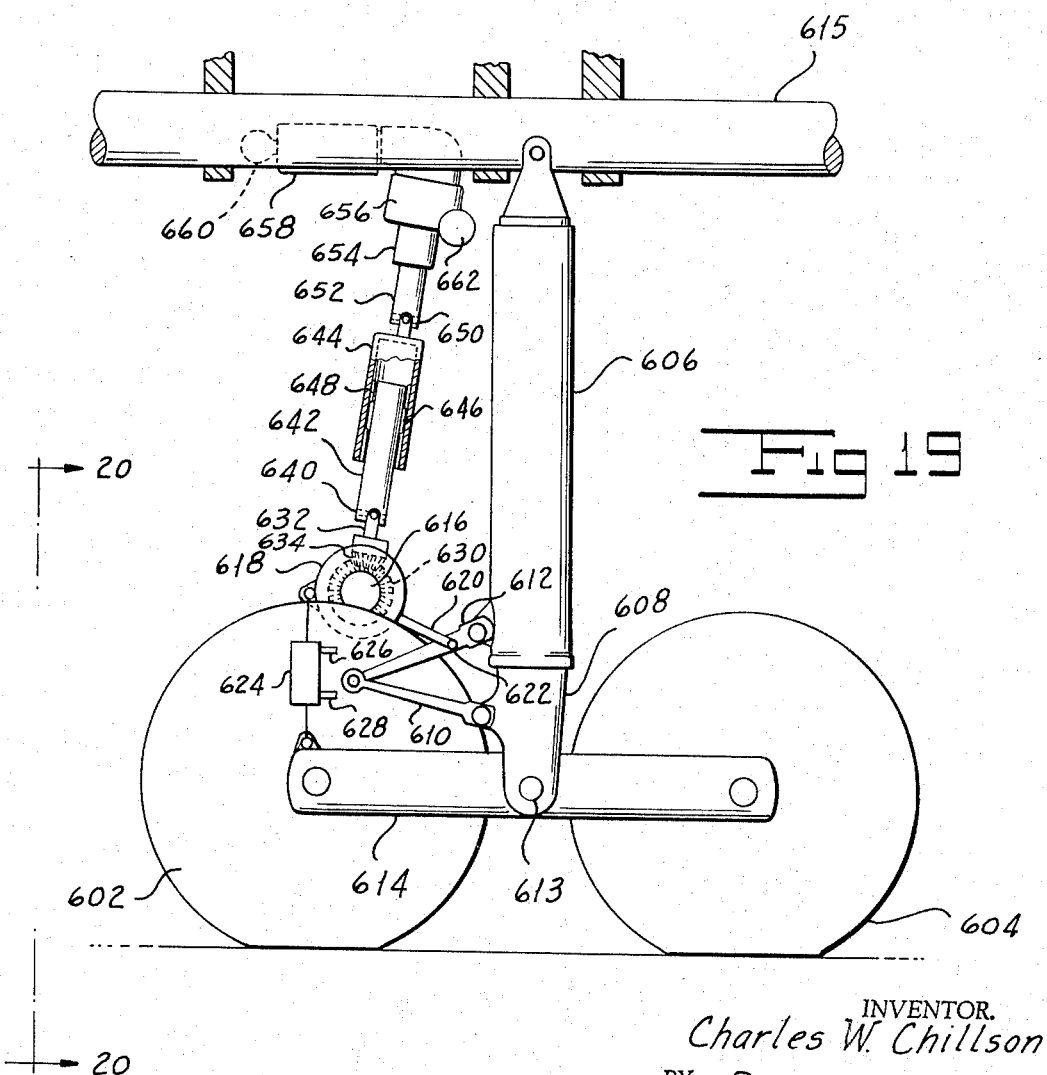

LANDING GEAR WHEEL DRIVE SYSTEM FOR AIRCRAFT

BACKGROUND OF THE INVENTION

In normal practice today, the aircraft power plants used to provide thrust in flight are also used to provide thrust to move the aircraft on the ground. Operation of the main aircraft power plants at the low powers for ground operation is very inefficient and therefore very wasteful of fuel. Also the low efficiency of the normal ground operation of aircraft engines contributes substantially to air pollution near airports and also contributes materially to the noise in the vicinity of airports. In addition, this use of the aircraft power plants for ground taxiing is generally limited to forward operation. Frequently an aircraft must be towed backwards away from its berth at an airport. With the present invention, there is provided a relatively simple and unique arrangement for driving the landing wheels of an aircraft in either forward or reverse direction, thereby making it possible to move the aircraft readily and efficiently along the ground under its own power in any direction. This not only avoids the need for tow trucks but also avoids damage to the aircraft by contact with or collision with a towing truck and minimizes the noise and air pollution which otherwise would result from operation of the main aircraft power plants for ground operation.

There are numerous patents showing various arrangements for driving the landing wheels of an aircraft. For example, such U.S. Pats. as: No. 2,507,440 — No. 2,460,387 — No. 2,298,523 — No. 2,287,491 show various schemes for providing a mechanical drive connection to the wheels of an aircraft landing gear. These patents are typical of such prior art in that each of the patents requires a significant redesign of the aircraft landing gears to accommodate the driving connection to the wheels of said landing gear. Hydraulic motors drivably connected to the landing gear wheels have also been suggested in the past, for example, as shown by u.S. Pat. No. 3,034,748. Here again, however, since the hydraulic motor is mechanically connected to the landing gear wheel, the landing gear must be modified in some manner for non-rotatively supporting the driving motor so as to provide a driving connection to the landing gear wheels. The present invention utilizes a simple arrangement in which driving torque is applied to the wheels of an aircraft landing gear by rollers or drums which are movable into and out of friction driving engagement with the tires of the aircraft landing gear wheels. It is realized that the use of a friction roller drive to a tire is a common type of drive, for example, for bicycles and similar vehicles and in addition has been utilized in connection with ground equipment for towing aircraft, for example, as shown by U.S. Pat. No. 2,751,990. The present invention, however, utilizes this simple friction drive in an unique arrangement in which the driving drum or drums are supported on the telescopic strut of an aircraft landing gear in such a manner that substantially non-slipping contact between the drum and the landing gear wheels can be maintained notwithstanding telescopic movements of the strut as the aircraft bounces slightly as it moves along the ground. In addition, with this invention the driving drums, their mounting and the means for bringing the drums into engagement with the landing wheels, the power means for driving the drums and the overall control system are uniquely combined not only to permit ready incorporation in an aircraft for ground taxiing operations, but also to minimize the weight of this added propulsion system.

SUMMARY

An object of the present invention comprises the provision of a novel and light weight mechanism for driving the wheel or wheels of an aircraft landing gear for ground taxiing of the aircraft without utilizing the main propulsion power plants of the aircraft thereby avoiding the noise and air pollution normally resulting from use of said power plants.

In accordance with the invention, friction drive drums are provided which are movable into and out of friction driving engagement with the wheel tires of an extendible and retractable aircraft landing gear having the usual shock absorbing telescopic strut and in which each friction drive drum is supported from its landing gear and is retracted with the landing gear into the aircraft when the aircraft is in flight.

More specifically, each friction drive drum preferably is supported at the lower end of its landing gear on conventional scissors-type linkage interconnecting the telescopic parts of the shock absorbing strut of its landing gear. With this arrangement, adequate contact pressure can be maintained between the friction drive drum and a wheel tire of its associated landing gear notwithstanding telescopic movement of the strut as the aircraft bounces slightly as it moves along the ground. By supporting the friction drive drums in this manner on said scissors type linkage, the drums do not add materially to the unsprung weight of the landing gear.

The auxiliary drive motors for the friction drive drums may be supported along with their drums in this same way at the lower ends of their landing gear. Instead, however, each auxiliary drive motor may be supported in the body of the aircraft and connected to its friction drive drum or drums by means of a flexible connection.

A common type of aircraft landing gear consists of a pair of side-by-side wheels carried by a single telescopic shock absorbing strut extending between the two wheels. In such a landing gear and in accordance with the invention, a pair of friction drive drums are provided, one for each wheel, with both drums being driven by a common auxiliary drive motor, preferably through differential gearing and being so supported from the telescopic strut so as to be movable into friction driving engagement with each wheel notwithstanding slight differences in the diameters of such wheels because of unequal tire wear. An auxiliary aircraft drive comprising a pair of friction drive drums supported in this manner provides an extremely compact arrangement. Accordingly, a further object of the invention resides in the provision of a compact arrangement in which a single auxiliary drive motor for a pair of friction drive drums is supported between the planes of rotation of a pair of landing gear wheels.

A still further object of the invention resides in the provision of means to insure adequate contact pressure between a friction drive drum and its wheel before significant drive power is applied to the drum so that the desired driving force can be transmitted to its associated landing wheel. This assumes a normal coefficient of friction between the driving drums and the tire of the landing wheel which coefficient may be about 0.5. In addition, it is an object of the invention to provide means for automatically disengaging each friction drive drum from its wheel should excessive slippage occur between the drum and its wheel as might arise, for example, should the wheel become covered with oil or other material so as to materially reduce the coefficient of friction between the drum and the wheel.

In a preferred form of the invention, each auxiliary motor for driving the friction drive drums consists of a hydraulic motor and the pressure of the hydraulic fluid supplied to the motor also serves to energize an actuator to move said friction drive drums into driving contact with the tires of their associated landing gear. Such a hydraulic auxiliary drive motor preferably is of the reversible type to avoid the need for reverse gearing. This hydraulic system provides a simple and relatively low cost and rugged arrangement. In another preferred form of the invention, each auxiliary drive motor consists of a gas turbine driven by combustion gases provided by burning fuel in air bled from a source of compressed air. This system, although somewhat more complex than the hydraulic system, results in a relatively light weight structure which may be particularly important if the aircraft is to be moved along the ground at speeds requiring larger auxiliary drive motors.

Accordingly, it is an object of the invention to utilize such hydraulic motors or bleed-burn type turbines for driving the landing wheels of an aircraft by means of friction drive drums engageable with tires of the aircraft landing gear.

It is a further object of the invention to utilize such a bleed burn turbine arrangement also for driving vehicles other than aircraft along the ground. Also, instead of driving the turbine by combustion gases provided by burning fuel in a supply of compressed air, the compressed air supply, if adequate, could be used directly for driving the turbine.

Another object of the invention resides in the provision of a single control lever in the aircraft for controlling the power output of each auxiliary drive motor as well as the engagement and disengagement of its friction drive drum or drums with its landing gear wheels. In accordance with the invention, at least two landing gears on opposite sides of the aircraft fuselage are provided with such a friction drive drum arrangement for driving the landing gear wheels and the friction drive drums for each of said landing gears preferably are controlled by a separate control lever in the aircraft so as to facilitate maneuvering of the aircraft along the ground.

Still other objects of the invention include the provision of means for minimizing the possibility of excess slip between the friction driving drums and the landing wheel tires with the resulting excess tire wear, for example as might occur if the tires should become coated with oil or other substance which materially lowers the coefficient of friction between the friction driving drums and tires. In addition, it is an object to insure that the driving drums are brought into substantial pressure contact with their tires before driving torque is supplied to the tires by said drums. Another object resides in the provision of means to positively hold the driving drums out of contact with their tires when the landing gears are extended or whenever the driving drums are not intended to be used.

If the contact pressure between the driving drums and tires is excessive, damage to the tires could result and if the contact pressure is too little the resulting slippage between the driving drums and tires could also damage the tires. Accordingly, it is also an object of the invention to provide means for automatically increasing and decreasing the contact pressure of the friction drive drums with their landing gear tires as the required driving torque is increased and decreased. With such an arrangement it is possible to use only enough contact pressure on the wheel tires to avoid excess slippage between the driving drums and tires.

Other objects of the invention include the provision of positive means for releaseably locking the friction drive drums out of contact with their landing wheel tires when such drums are not in use. Also, in accordance with the invention, each friction drive drum preferably is supported so that when frictionally driving its landing wheel the friction drive forces do not materially alter the contact pressure of said drum on the wheel. In addition, means preferably are provided for vibrationally isolating the friction drive drums and their auxiliary drive motors from their landing gear wheels.

Other objects of the invention will become apparent on reading the next detailed description in connection with the drawings.

BRIEF DESCRIPTION OF THE DRAWINGS

FIG. 1 is a front view of a conventional aircraft landing gear having two side-by-side wheels and showing the friction driving drum members of the invention and their support for driving the landing gear wheels for taxiing the aircraft along the ground.

FIG. 2 is a view taken along line 2—2 of FIG. 1, but enlarged.

FIG. 3 is an enlarged view taken along line 3—3 of FIG. 2.

FIG. 4 is an enlarged view taken along line 4—4 of FIG. 1.

FIG. 5 is a schematic view showing a hydraulic motor system for driving the drum members of FIGS. 1 and 2 and for controlling operation thereof.

FIG. 6 is a front view of an aircraft showing a typical application of the invention.

FIG. 7 is a schematic view of a modified form of the invention showing a bleed-burn turbine arrangement for driving the drum members of FIGS. 1 and 2 and for controlling the operation of the turbine and engagement of the drum members with the landing gear wheels.

FIG. 8 is a sectional view of the air valve control mechanism taken along line 8—8 of FIGS. 7 and 9.

FIG. 9 is a sectional view taken along line 9—9 of FIG. 8.

FIG. 10 is a view similar to FIG. 9 but showing the control lever in a different position.

FIG. 11 is a sectional view showing the main components of the air valve control mechanism as viewed from line 11—11 of FIG. 8.

FIG. 12 is a view similar to FIG. 9 but showing the control mechanism in its air valve open position.

FIG. 13 is an enlarged view of the turbine showing a reversing mechanism.

FIG. 14 is a view taken along line 14—14 of FIG. 13.

FIG. 15 is a sectional view of the slip responsive mechanism taken along line 15—15 of FIG. 16.

FIG. 16 is a view taken along line 16—16 of FIG. 15.

FIG. 17 is a diagrammatic view for explaining the operation of FIG. 15.

FIG. 18 shows a preferred form of the motor or actuator for engaging the drum members with the tires of the landing gear wheels.

FIG. 19 is a view similar to FIG. 2 but illustrating a modified form of the invention in which the auxiliary motor for applying power to the landing gear wheels is supported at the upper end of the landing gear rather than at the lower end.

FIG. 20 is a view taken along line 20—20 of FIG. 19.

DESCRIPTION OF THE PREFERRED EMBODIMENTS

Referring first to FIGS. 1 or 2 of the drawing, there is shown a landing gear 10 for an aircraft, the body of which is indicated schematically at 12. As illustrated, the landing gear 10 consists of a telescopic strut comprising telescopic parts 14 and 16, the part 14 being connected to the aircraft and the part 16 having a cross-shaft 18 at its outer end on which a pair of landing wheels 20 are journaled so that the wheels are coaxially supported in side-by-side relation with the landing gear strut extending from between the wheels. The telescopic parts of the strut are interconnected by a scissors linkage consisting of links 22 and 24. The link 22 has one end pivotally connected to the telescopic part 14 and the link 24 has one end pivotally connected to the other telescopic part 16 adjacent to the axis of the landing wheels. The links 22 and 24 are pivotally connected together adjacent to their other ends as shown at 26. The entire landing gear 10 is arranged to be retracted into the aircraft 12 as by swinging motion in the direction of the arrow 28 (FIG. 1).

The landing gear structure so far described is quite conventional and in fact is similar to the landing gear used in 727 type aircraft. As will be apparent, however, the invention is equally applicable to other types of landing gear.

In accordance with the invention, a pair of drum members 30 are arranged to move into friction driving engagement with the periphery of the tires on the landing gear wheels 20 for driving these wheels while the aircraft is on the ground. As shown, the drum or roller members 30 are journaled on a housing or frame member 32 which is pivotally supported from a bifurcated extension 34 of the link 24. The link extension 34 is pivotally connected to the housing member 32 for swingably supporting the housing members. For this purpose the link extension 34 has a pivot pin 36 at its outer end with one end of the pin being received within a cylindrical bore in an ear 38 on the housing member 32 and with the other end preferably being received within a cylindrical bore in one end of a small link 40. The other or outer end of the small link 40 is pivotally connected to the housing member by means of a pin 42 (FIG. 3) which extends through cylindrical bores in the outer end of the link 40 and in a pair of additional ears 44 of housing member 32.

The housing member 32 with its drum members 30 is arranged to be swung about the axis of the pivot pin 36 for moving the drum members 30 into and out of driving engagement with the landing gear wheels 20. For this purpose a motor or actuator 46 (preferably hydraulic) has one end pivotally connected to the outer landing gear strut 16 and has its piston rod 47 extending from its other end with said piston rod being pivotally connected to the housing member 32. The actuator 46 also has a spring 48 which serves to urge the drum members out from engagement with the landing wheels 20. Application of hydraulic pressure to the line 50 acts against the actuator piston 52 to move the piston 52 against the spring 48 whereupon the resulting motion of the piston rod 47 is effected to swing the drum members 30 into the position shown in FIG. 2 in which they are in driving engagement with the wheels 20.

One end of the pivot pin 36 is connected to the housing member 32 by means of the link 40 so as to permit the housing member 32 and its drum members 30 to tilt about a vertical axis so as to accommodate the landing wheels 20 having tires of slightly different diameter because of, for example, differences in the amount of wear on each tire. With this construction, upon energization of the hydraulic actuator 46, the drum members 30 are brought into engagement with both wheels 20. Equal contact pressure of the drum members 30 on the wheels 20 notwistanding slight differences in the diameters of said wheels can be obtained if a spherical or angularly flexible type bearing is provided, such as illustrated at 54 and 56 in FIG. 3, between the link 40 and the pivot pins 36 and 42 respectively and similarly (but not shown) between the pivot pin 36 and the ear 38.

As illustrated in FIGS. 1 and 2, the housing or frame member 32 supports a suitable motor 60 for driving the drum members 30 so that this motor is supported between the planes of rotation of the two landing gear wheels 30 thereby providing an extremely compact arrangement. As will become apparent, however, it is also within the scope of the invention to support the auxiliary motor within the aircraft with the motor being connected to the drum members 30 by means of a flexible connection.

The motor 60 is connected to the drive shaft 62 for each drum member through suitable gearing as hereinafter described. With the housing member 32, drum members 30 and driving motor 60 supported by the conventional scissors links 22 and 24 of the landing gear, most of the weight of these parts is carried by the link 22 and therefore a major portion of this weight is carried directly by the aircraft body and hence is not unsprung weight.

With the structure described in which the drum members 30 are supported from the links 22 and 24, the actuator 46 can maintain the drum members 30 in frictional engagement with the landing gear wheels with negligible motion of the actuator piston 52 notwithstanding extension and retraction movements of the landing gear strut parts 14 and 16 as the aircraft bounces slightly in taxiing along the ground. This is so since use of the linkage 22 and 24 for supporting the drum members 30 results in only minimum radial displacement of the drum members 30 relative to the wheels 20 during such extension and retraction movements of the landing gear.

When the drum members 30 are not being used to drive the landing gear wheels 20, the actuator 46 is extended, as hereinafter described, to move drum members 30 out from engagement with the wheels notwithstanding the extension and retraction movements of the landing gear strut parts 14 and 16. When the aircraft has lifted off the ground in take off, the landing gear strut parts 14 and 16 become extended to their maximum extent. With this maximum landing gear extension, the links 22 and 24 together with actuator 46 (in its extended position) are effective to position the housing member 32 relative to the landing wheels 20 so that the drum members 30 do not contact said wheels, as shown in FIG. 2 by the phantom position of the housing member 32 and drum members 30. The entire landing gear with the housing member 32 and its drum members 30 are retracted into the aircraft by swinging the landing gear along the path 28 shown in FIG. 1 but with the landing gear in its fully extended position.

As illustrated in FIG. 2, the tangent 63 to the point of engagement between a drum or roller member 30 and the periphery of the landing gear wheel 20 engaged by said drum member passes through an extension of the axis of the pivot connection provided by the pivot pin 36. With this arrangement the tractive effort, that is, the friction driving force exerted by each drum member 30 on its wheel, passes through the axis of this supporting pivot and therefore this friction force has no significant component normal to this point of engagement. Accordingly, the contact pressure between each roller member 30 and its tire is controlled solely by the force applied by the actuator 46 and is substantially independent of the tractive effort. This tangential arrangement can only be approximately so since each drum member 30 depresses its landing wheel tire 20 to a variable extent depending on the contact pressure therebetween as provided by the actuator 46.

In order to adequately support the drum members 30 against the forces acting thereon when they are driving the wheels 20, the housing member 32 preferably extends into and substantially through each drum member 30 as shown in FIG. 4. In this way, a supporting bearing 64 can be provided at each end of each drum member 30. The driving shaft 62 for each drum member 30 extends beyond this housing extension and has a splined connection 66 with its drum member at the end of said drum member remote from the other drum member.

As illustrated in FIG. 5, the auxiliary motor 60 for driving the friction drive drums 30 is a conventional positive-displacement hydraulic motor of the type having a plurality of plungers spaced circumferentially about the motor axis and in which the piston forces are transformed into torque by reaction against a nonrotatable swash plate. Details of a complete system utilizing such a hydraulic motor are schematically shown in FIG. 5. The body of the aircraft is schematically indicated by the line 12 and the parts above this line are housed within the aircraft and those below the line are supported on the landing gear as has been described.

Referring now to FIG. 5, an auxiliary power unit 80 of the aircraft is drivably connected to a positive-displacement hydraulic pump 82. Hydraulic fluid is discharged under pressure from the pump 82 through the line 84 and hydraulic fluid is returned to the pump through the low pressure line 86. The pump is provided with a pressure relief valve 87 and also with a heat exchanger 88 to prevent excessive temperature build-up. In addition, an air loaded accumulator 90 preferably is provided to maintain inlet pump pressure resulting from changes in the volume of the hydraulic system caused by thermal and other volumetric changes and to accommodate minor leakage.

The hydraulic pressure and return lines 84 and 86 are connected to a body 91 of a control valve 92 having a bore 94 in which a valve spool 96 is axially slidable. The valve spool 96 has a pair of lands 98 and 100 which have a close sliding fit within the bore 94. As shown, the low pressure return line is connected to valve bore spaces beyond the lands 98 and 100. The valve body 91 also has a pair of outlet passages 102 and 104 which, in the neutral position of the valve spool 96 illustrated in FIG. 5, are closed by the lands 98 and 100 respectively. As shown, the valve outlet passages 102 and 104 are connected to the hydraulic motor 60.

The control valve 92 also has an extension 106 on its valve spool 96 which forms the plunger of a magnetic solenoid having spaced windings 110 and 112 on a magnetic core. The winding 110, when energized, is arranged to pull the plunger 106 and its valve spool 96 to the left and the winding 112, when energized, is arranged to pull the plunger and its valve spool 96 to the right, as viewed in the drawing. The plunger is centered by the springs 114 in the position illustrated when the windings 110 and 112 are de-energized. When the coil 110 is energized (the coil 112 being de-energized) the valve spool 96 is moved to the left from its neutral position against the action of the centering springs 114. The valve outlet passage 104 is now opened to the high pressure supply line 84 of the pump 82 to an extent dependent on the magnitude of this leftward movement of the valve spool and the valve outlet passage 102 is opened to a corresponding extent to the pump return line 86. The resulting pressure differential is supplied to the hydraulic motor 60 and in a known manner produces forces on the piston-like plungers 116 of the motor which by their reaction on the inclined nonrotatable swash plate 118 produce torque to rotate the plunger barrel 120 and its output shaft 122. The output shaft 122 for the hydraulic motor 60 is connected to the drive shafts 62 for the two drum members 30 of FIGS. 1 and 2 through suitable gearing 124. The gearing 124 preferably includes differential gearing 126 to accommodate relative rotation of the two landing gear wheels 20 as is required, for example, when the aircraft is turning in its motion along the ground.

When the coil 112 is energized (the coil 110 being deenergized) the valve spool 96 is moved to the right from its neutral position so that now the high pressure supply line 84 is connected to valve outlet passage 102 (instead as above to the passage 104) and the valve outlet passage is connected to the pump return line 86. Accordingly, the differential hydraulic pressure to the motor 60 is now reversed thereby reversing the direction of rotation of the motor 60 and hence driving the drums 30 in the opposite direction.

Energization of the solenoid windings 110 and 112 is effected by the operator within the aircraft by movement of a manual control lever 130 from its central or neutral position, illustrated in FIG. 5, to the left into its forward motion range or in the opposite direction into its reverse motion range. For this purpose, the lever 130 has an electric brush-type contact 132 which is moved over the electrical resistance 134 when the lever 130 is moved in its forward range and is moved over the resistance 136 when the lever 130 is moved in its reverse range. The resistance 134 is connected in series with the solenoid winding 110 and a source of electric energy 138 and the resistance 136 is connected in series with the solenoid winding 112 and said source of energy. In the central position of the control lever 130 its contact 132 is not in engagement with either of the resistances 134 or 136 and therefore in this position of the control lever, both solenoid windings 110 and 112 are de-energized.

The magnitude of the resistance 134 in series with the winding 110 decreases as the control lever 130 is moved further to the left from its central position whereupon the leftward force produced by the solenoid winding 110 on the valve spool 96 increases causing the valve spool to move further to the left thereby progressively increasing the extent to which the valve outlet passages 102 and 104 are opened. This thereby increases the pressure differential on the hydraulic motor 60 to increase its output torque.

Similarly as the control lever 130 is moved to the right in its reverse range, the rightward force produced by the solenoid winding 112 on the valve spool 96 progressively increases to progressively open the valve outlet passages 102 and 104 thereby causing output torque of the motor 60 to progressively increase but now in the reverse direction.

When the control lever 130 is moved to either extreme position in its forward or reverse thrust range, the force exerted by the energized solenoid winding 110 or 112 is sufficient to move the valve spool against a stop 140 or 142 (depending on the direction of motion of the lever 130) such that the valve outlet passages 102 and 104 are now fully open thereby providing maximum output torque for the motor 60.

For reasons of illustration only so as to show the parts in one plane, in the schematic view of FIG. 5 the drum members 30 are illustrated in a position above the wheels 20 with the actuator 46 through its piston 52 and piston rod 47 being arranged to push the drum members 30 down against the wheels 20 instead of pulling the drum members horizontally against the wheels as in the actual physical arrangement shown in FIG. 2. In either case, however, the spring 48 of the actuator urges the drum members 30 out from engagement with the landing gear wheels 20.

A solenoid valve 150 is provided for controlling the application of hydraulic pressure to the actuator 46 to insure energization of this actuator for moving the drums 30 into driving engagement with their landing wheels 20 promptly when the hydraulic motor 60 is being energized. For this purpose the solenoid winding 152 of the valve 150 is connected in series with the common lead 153 of control valve windings 110 and 112 so that the solenoid 152 is energized whenever the control lever is moved from its neutral position to cause its contact 132 to engage either of the resistances 134 or 136.

The body of the valve 150 has inlet passages 154 and 156 connected to the supply line 84 and return line 86 respectively of the pump 82 and has an outlet port 158 connected to the pressure supply line 50 for the actuator 46. A movable valve element 160 is urged by a spring 162 to the position illustrated in which the passage 154 is closed to the outlet port 158 and the valve outlet port 158 is connected to the pump return line 86 via the line 156. Hence in this position of the valve 150 the actuator 46 is de-energized and therefore the drums 30 are out of contact with their landing wheels 20. To insure that the drum members 30 do not accidentally bounce into engagement with the wheels 20 because of any bouncing motion of the aircraft as it moves along the ground, the actuator 46 preferably is provided with a releaseable latch arrangement (not shown in FIG. 5) for holding the drum members 30 out from engagement with the wheels 20 when the actuator 46 is de-energized. Such a latch arrangement is hereinafter described in connection with FIG. 18.

The valve element 160 is movable against its spring 162 by its solenoid 152 (when energized) to its uppermost position to open the passage 154 and close the passage 156. The valve outlet port 158 is now in communication with the output pressure of the pump 82 whereupon the pressure is supplied to the actuator 46 to move the drums 30 into full load carrying frictional engagement with their wheels 20.

From the foregoing description of FIG. 5 it is apparent that when the control lever 130 is moved in either direction from its neutral position, the moment contact 132 engages either of the resistances 134 or 136, the valve 150 is opened to apply full hydraulic pressure to the actuator 46 thereby insuring full contact pressure of the drums 30 against their wheel tires, before the motor 60 reaches full output torque. This precaution is important to avoid tire damage which might occur were the drums 30 moved into engagement with their wheel tires when the motor 60 was at full output torque.

As stated, the hydraulic motor 60 is a conventional positive-displacement type hydraulic motor in which the axial motion of a plurality of pistons 116, spaced circumferentially about the axis of the motor, is transformed into torque by the reaction of their axial forces on an inclined non-rotating swash plate 118. In the case of the motor 60 the inclination of the swash plate 118 is variable. For this purpose the swash plate has a fixed pivot (not shown) having its axis at 170 and the plate is tiltable about this axis to balance the opposing forces exerted on the plate by a spring 172 and a piston 174. Hydraulic pressure from the output line of the pump 82 is supplied to the piston 174 by a line 176 to provide a force urging the swash plate clockwise (as viewed in FIG. 5) about its pivot 170 against the spring 172. This force is sufficient to tilt the swash plate to its maximum extent by moving this plate against the stop 178 thereby providing for maximum hydraulic displacement and output torque of the motor 60. This maximum torque is designed to be adequate to move the aircraft on the ground from a stop position and to accelerate the aircraft along the ground. However, the capacity of the pump 82 is limited such that at some speed below maximum desired ground speed, the maximum liquid flow available from the pump 82 is reached and therefore the aircraft can not be driven any faster under these conditions.

When the liquid supply pressure in the line 84 decreases as a result of the liquid flow having reached the total flow output of the pump 82, the pressure in the line 84 starts to drop and therefore the hydraulic pressure on the swash plate piston 174 likewise drops. As a result, the spring 172 is effective to pivot the swash plate 118 counter-clockwise toward a stop 180 at which the tilt of the plate about its axis 170 is at a minimum so that the liquid displacement of the motor 60 per revolution would then be at a minimum and the torque output is likewise at a minimum. However, notwithstanding this decreased torque output, since the resistance to ground motion of the aircraft is less after it is moving and since the motor 60 now requires less liquid per revolution, the ground speed of the aircraft can continue to be increased.

Obviously, the swash plate 118 may tilt counter-clockwise only to an intermediate position between the stops 178 and 180 if lesser ground speed is desired and/or if the resistance to ground motion should be less. In any case, this automatic pivoting of the swash plate 118 to positions of lesser tilt as the output pressure of the pump 82 starts to fall, provides for propulsion of the aircraft along the ground close to the maximum power available from the hydraulic output of the pump 82.

Other types of positive-displacement hydraulic motors are also available in which the hydraulic displacement of the motor per revolution is varied as a direct or indirect function of the hydraulic pressure supplied to the motor. The motor 60 described is but one example of such motors so that the invention is not limited to this specific type of motor.

In accordance with the invention, at least two of the landing gear units of an aircraft, one on each side of the aircraft or under each wing would be provided with auxiliary drive motors 60 and associated drum members 30 for driving their landing gear wheels, for example, as schematically illustrated in FIG. 6. As there shown, an aircraft is provided with two landing gears 10 disposed on opposite sides of its fuselage 190 under its wings 192. Each of these landing gears are provided with drum members 30 and an auxiliary drive motor 60 for driving the landing gear wheels 20. Preferably, each such landing gear auxiliary drive means will be provided with its own control such as shown in FIG. 5 having its own manually operable control lever 130. However, a single auxiliary power unit 80 and pump 82 may supply the hydraulic pressure for each of the auxiliary hydraulic motors 60. Accordingly, when the aircraft is on the ground each control lever 130 for an auxiliary motor 60 (and its drum members 30) associated with a particular landing gear can be controlled for regulating the direction and magnitude of the power applied to its landing gear wheels independently of the corresponding control for the auxiliary drive for the wheels of the other landing gear. It is apparent, therefore, that by suitable manipulation of the control levers 130 the aircraft can readily be maneuvered along the ground.

The driving motor for the drums 30 instead of being a hydraulic motor alternatively may be a bleed-burn type of turbine 60a (FIG. 7) in which fuel burned in air bled from a source of compressed air provides combustion gases for driving the rotor of said turbine. This arrangement provides an extremely light weight construction. If the aircraft is to be moved by the auxiliary drive motors at only a relatively low speed, for example 5 miles per hour, then relatively small power auxiliary drive motors can be used in which case the added weight of hydraulic motors becomes less objectionable and hydraulic motors may even be preferable because of their low cost and greater ruggedness. On the other hand, if the aircraft is to be moved at higher speeds, for example 30 miles per hour, then relatively larger power auxiliary drive motors would be required. In such an application the relatively light weight of the bleed-burn type of turbine motor becomes particularly important.

The details of a complete system utilizing such a bleed-burn type of turbine motor is schematically shown in FIG. 7. The body of the aircraft is again schematically indicated by the line 12 and the parts above this line are housed within the aircraft and those below the line are supported on a landing gear as has been described.

Referring now to FIG. 7, an auxiliary power unit 200 of the aircraft is shown drivably connected to an air compressor 202. Air from the compressor 200 (or other available compressed air source) is supplied to a burner unit or combustion chamber 204 through the conduit 206 and under the control of a valve 208. Fuel from a supply line 210 is also supplied to the burner unit 204 via a fuel regulator 212, shut-off valve 214 and line 216, the fuel regulator controlling the fuel flow in accordance with the air flow. The burner unit 204 also has a suitable igniter such as a spark plug 218 for igniting the combustible mixture in the burner unit. The spark plug is connected to a source of electric power 220 via a switch 222 and high tension converter 224 and the low tension and high tension leads 226 and 228 respectively.

A simple fuel regulator 212 has been shown although any suitable fuel regulator may be used. As illustrated, the fuel regulator 212 consists of a spool-type valve element 230 urged to its closed position by a compression spring 232 at one end of the valve. Air is admitted to the other end of the spool valve by a conduit 234 connected to the air supply line 206 downstream of the air control valve 208. In this way, when the air valve 208 is opened, the fuel valve 230 is opened a distance dependent on the magnitude of the pressure of the air supplied to the burner unit 204. By suitably contouring the port at the valve end of the supply conduit 210 any desired relation between fuel flow and burner supply air pressure can be provided.

The burner air supply pressure is also used to control energization of the spark plug 218. For this purpose, a bellows 236 is connected to the air supply line 206 downstream of the air valve 208. When the air valve 208 is opened, the bellows 236 expands against a spring 238 to close the ignition switch 222 thereby energizing the spark plug 218 through connection 226, high tension converter 224 and connection 228. Closure of the ignition switch 222 also is effective, through the connections 226 and 240 to a solenoid 242 to open the fuel valve 214. In this way, no fuel is supplied to the burner unit 204 until the spark plug circuit is energized.

Combustor gases from the burner 204 are supplied to an annulus 250 surrounding a radial inflow type of turbine rotor 252 for the turbine unit 60a. The details of this turbine unit 60a and its rotor 252 are hereinafter more fully described. Suffice it to say at this point that the turbine includes inlet guide vanes 254 which are movable by suitable gearing (FIG. 13) to determine the direction of rotation of the turbine rotor 252.

The turbine rotor is connected by suitable reduction gearing 260 to the drum member drive shafts 62. As in FIG. 5, said gear connections preferably include differential gearing 262 to accommodate relative rotation of the two wheels 20 of a landing gear as when the aircraft is turning in its motion along the ground. Also as in FIG. 5, in FIG. 7 the drum members 30 are again shown above their landing gear wheels for ease of illustration and therefore in FIG. 7 as in FIG. 5 this actuation is shown as pushing the drum members 30 against their wheels 20 upon the application of hydraulic pressure to the actuator instead of pulling the drum members horizontally as in FIG. 2. As shown, the actuator 46a of FIG. 7 is similar to the actuator 46 of FIG. 5 and for convenience the parts of actuator 46a corresponding to those of actuator 46 have been designated by the same reference numeral but with a subscript $a$ added thereto.

Hyraulic pressure is supplied to the actuator 46a from a source of hydraulic pressure 270 and a valve 272 to which the actuator input line 273 is connected. The valve 272 is shown as consisting of a spool-type valve member 274 which is urged to the left of the position illustrated by a spring 276. In this position the actuator input line 273 is vented to a drain passage 278. Accordingly, in this position of the valve member 274 the spring 48a of the actuator 46a is effective to keep the drum members 30 out from engagement with the landing gear wheels 20. The valve 272 also includes a solenoid 280 which when energized is effective to move the valve element 274 to the right to bring the hydraulic pressure supply 270 into communication with the passage 273. This pressure in the passage 273 is communicated to the actuator 46a whereupon it is effective to move the actuator piston 52a against spring 48a to bring the drum members 30 into driving engagement with the wheels 20.

When the actuator input passage 273 is vented at the valve 272, the spring 48a of the actuator 46a is effective to move the drum members 30 out from engagement with the wheels 20. Here again, as in FIG. 5, the actuator preferably is provided with the releasable latch arrangement of FIG. 18 to hold the drum members out from engagement with the landing gear wheels 20 when the actuator is de-energized.

The valve 272 for the actuator 46a and the air valve 208 for the bleed-burn turbine 60a are both controlled by a lever 290 secured to and extending from a shft 292 which is mounted for rotation on the housing 294 of a control mechanism 296. The lever 290 is controllable by the aircraft pilot or other operating personnel of the aircraft. As hereinafter described, the lever 290 is movable about the axis of its pivot shaft 292 in one direction from its neutral position illustrated in FIG. 7 for causing operation of the turbine 60a in a direction to drive the wheels 20 for forward motion of the aircraft and is movable in the opposite direction for causing the wheels 20 to be driven for reverse motion of the aircraft.

The control lever 290 is illustrated in FIG. 7 in its neutral position. The lever is movable to either side of this neutral position in a range designated the dead zone range in the drawing because movement in this range has no effect on the position of the turbine air valve 208. Movement of the lever 290 to the left (as viewed in the drawings) beyond the dead zone range is effective to open the turbine air valve 208 to an extent depending on the magnitude of movement of the lever beyond the dead zone range for operating rotor 252 of the turbine 60a in direction for forward motion of the aircraft. Movement of the control lever 290 in the other direction, that is, to the right beyond the dead zone range is also effective to open the turbine air valve 208 but now for operation of the turbine rotor 252 in the reverse direction. The dead zone range thereby physically separates the ranges of movement of the control lever 290 for forward and reverse operation.

At this point it should be noted that for lower power operation, the turbine 60a could be operated solely on the compressed air supply, that is, the turbine 60a could be operated without the addition of fuel for combustion with said air in the burner 204. In fact, if an adequate supply of compressed air were available the burner 204 and its associated fuel supply could be eliminated.

Referring now particularly to FIGS. 8, 9 and 10, the control lever 290 is shown as having a portion 300 extending from the diametrically opposite side of its pivot shaft 292 and carrying a roller 302 at its end. The roller 302 is received between the arms 304 and 306 of a forked lever 308 which is secured to a shaft 310 journaled in the housing 294. The shaft 210 is operatively connected to the reversing gearing (see FIG. 13) for the inlet guide vanes of the turbine 60a, for example, by means of a flexible cable 312. The construction of these guide vanes and their function is more fully described in connection with FIGS. 13 and 14.

The facing surfaces of the two arms 304 and 306 are such that movement of the control lever 290 between the limits of its dead zone range moves the forked lever 308 between the phantom lines 314 and 316 thereby rotating the shaft 310 and its flexible cable 312 through this same angle. Thus, movement of the control lever 290 to the left from its neutral position of FIG. 9 to the end of the dead zone range brings the lever 290 to the position of FIG. 10 and results in the forked lever 308 being rocked to its limiting position (designated by the line 316) against a stop 318 on the housing 294. Further motion of the control lever 290 to the left in its forward power range causes the roller 302 to move along the surface portion 320 of the forked lever 308. This surface portion 320 is a circular arc which now has its center on the axis of the shaft 292 so that this further motion of the control lever does not tend to cause any further rocking motion of the forked lever 308. The arms 304 and 306 of the forked lever are similar so that motion of the control lever 290 to the right to the limit of its dead zone rocks the forked lever 308 in the other direction against the stop 322 and further motion of the control lever in this rightward direction tends to produce no further motion of the forked lever, the roller 302 simply moving along the circular arc portion 324 of the forked lever arm 304.

The pivot shaft 292 of the control lever 290 extends into the control mechanism housing 294 for controlling the operation of the hydraulic valve 272 and air valve 208. The details of this control mechanism and its housing 204 are best seen in FIGS. 11 and 12.

Referring now to FIGS. 11 and 12, the shaft 292 extends through a wall in the control housing 294 and has an arm 340 extending laterally therefrom with a cam follower roller 342 at its outer end. The cam roller 342 is received within a groove or track 344 formed in a cam plate 346 to which is secured a tubular extension member 348 whose axis is disposed normal to the axis of the shaft 292. As illustrated in FIG. 11, this cam track 344 has a mid-portion 350 which is a circular arc having its center on the axis of the shaft 292.

When the control lever 290 (with its pivot shaft 292) is in its neutral position, the cam roller 342 is positioned (as shown in FIG. 11) midway of the circular arc portion 350 of the cam track 344. Accordingly, rotation of the control lever through a limited arc simply moves the cam follower along this circular portion 350 of the cam track 344 and therefore does not produce any motion of the cam track plate 346 and its tubular extension member 348. This range of movement of the control lever 290 corresponds to the dead zone range previously described.

At each end of the circular cam track portion 350, the track has a portion 354 which, as shown, is so oriented that when the control lever 290 is moved in either direction from its neutral position and beyond its dead zone, the cam roller 342 enters an end portion 354 of the cam track 344 and, because of the orientation of these end portions 354, is effective to move the cam plate 346 and its tubular extension 348 to the left as viewed in FIGS. 11 and 12. This is true whether the control lever 290 is swung to the right (FIGS. 7 and 9) beyond the dead zone for reverse aircraft motion, or to the left beyond the dead zone for forward motion.

A shaft-like member 364 is slidingly received within the tubular extension 348. The end of the shaft member 364 received within this extension 348 is hollow and has an internal shoulder 366. A compression spring 368 extends between the shoulder 366 on the member 364 and the closed end of the tubular extension member 348 which is secured to the cam plate 346 so as to urge members 348 and 364 axially apart. The other end of the shaft member 364 is operatively connected to the air valve 208 by a connection indicated at 370 which may be a mechanical connection or may include a servo mechanism, particularly if the valve 208 is at a remote location from the control lever 290. The control housing 294 may also include a shoulder 372 to limit motion of the shaft 364 to the right beyond its position in which the air valve 208 is fully closed. Also for support, the cam plate 346 has a shaft-like extension 373 to the left as viewed in FIG. 11 for extension through the housing 294 to support the left end of the movable members of the control mechanism 296.

Mounted on an extension of the tubular member 348 is a releaseable latch member 374 which engages an external shoulder 376 on the shaft 364 for normally preventing the spring 368 from moving the shaft to the right relative to said tubular member 348.

With the structure of the control mechanism 296 so far described, initial motion of the control arm 290 from its neutral position but within the dead zone range moves the cam follower 342 along the circular arc portion of the cam track 344 and therefore produces no motion of the tubular member 348. Further motion of the control arm 290 beyond its dead zone range in either direction, moves the cam follower 342 into one of the end portions 354 of the cam track, thereby serving to move the tubular member 348 to the left from its position of FIG. 11 and toward its position of FIG. 12. With the latch member 374 in the position illustrated, this motion of the tubular member 348 produces a corresponding motion of the shaft 364 to open the air valve 208 to an extent dependent on the extent to which the control arm 290 is moved.

The latch 374 is a safety device to permit automatic return of the air valve 208 to its closed position, for example, if the turbine should overspeed for any reason, including excess slippage of the drum members 30 on the wheels 20. For this purpose the latch member 374 extends across the poles of an electromagnet 378 which is supported on the tubular member 348. A spring 380 serves to hold the member 374 in its latched position. The electromagnet 378 is connected by an electric connection 382 to a governor controlled switch 384 (shown in FIG. 7) responsive to the speed of the turbine rotor 252. For this purpose, as shown in FIG. 7, the turbine rotor 252 is connected to a centrifugal type governor 386 such that when its speed exceeds a predetermined value, the governor weights 388 fly out against the spring 390 to close the switch 384.

Returning now to FIG. 11, when the governor switch 384 is closed, a circuit is completed from this switch through the line 382 to the electromagnet 378 and source of electric energy 392 to energize the magnet and withdraw the latch 374 against its spring 380. The spring 368 is now free to move the shaft 364 to the right (FIG. 11) to close the air valve 208 thereby shutting down the turbine.

In order to insure that the actuator 46a is effective to urge the drum members 30 into driving engagement with the wheels 20 before any significant power is supplied to the turbine, a switch 394 is mounted on the control mechanism housing 294. The switch 394 has a control button 396 which is arranged to be moved downwardly (FIG. 11) by a shoulder 398 on the shaft 364 at the first motion of the shaft 364 to the left from its valve closed position thereby closing the contacts of switch 394. The two contacts of the switch 394 are connected to a source of electric energy 400 and by an electric line 402 to the solenoid 280 of the hydraulic valve 272.

Accordingly, closure of the switch 394 is effective to energize the solenoid 280 to open the hydraulic valve 272 to admit hydraulic pressure to the actuator 46a to engage the drum members 30 with the wheels 20. In this way, the initial motion of the shaft 364 for opening this air valve 208 immediately is effective to cause the actuator 46a to move the drum members 30 into engagement with the wheels 20.

A latch member 404 is provided to insure that adequate hydraulic pressure is supplied to the actuator 46a before substantial power is supplied to the turbine to minimize any initial slippage of the drum members 30 on the wheels 20. This latch member, when in the position shown in FIG. 11, is arranged to permit only a very limited motion of the shaft 364 in an air valve opening direction so that this motion is only sufficient to close the switch 394. The latch member 404 is pivotally supported on the control mechanism housing 294 and has a head portion, which in the position of FIG. 11, is just slightly beyond the shoulder 398 on the shaft 364. Thus, the shaft 364 can be moved to the left slightly (as limited by the latch 404) to close the switch 394 but further motion is prevented by the latch 404. A spring 406 serves to hold the latch in this position. For releasing the latch 404, a piston 408 bears on one end of the latch. Hydraulic pressure is supplied from the output of the valve 272 through a line 410 to the top of the piston 408. Thus, when the hydraulic pressure supplied to the actuator 46a reaches a predetermined value, it is effective to move the piston 408 against its spring 412 to release the latch 404 by moving the latch against its spring 406 thereby permitting further motion of the shaft 364 to the left under control of the control arm 290 to open the air valve 208.

Referring now to FIGS. 13 and 14 which show an enlarged view of the turbine 60a. As illustrated, combustion gases from the combustor 204 are supplied to the turbine annulus 250 from which the gases are directed by guide vane structure 254 to the radial vanes 422 on the turbine rotor 252, said radial vanes being enclosed by the stationary shroud 424. The guide vane structure comprises first and second sets of circumferentially spaced vanes 426 and 428. As shown in FIGS. 13 and 14, the first set of guide vanes 426 is in a position to direct the combustion gases between the turbine rotor vanes 422 to impart clockwise rotation (as viewed in FIG. 14) to the turbine rotor 252. The guide vane structure 254 may, however, be shifted to the left to bring the second set of guide vanes 428 in position to direct the combustion gases between the turbine rotor vanes 422. The guide vanes 428 are oppositively directed relative to the vanes 426 and therefore the turbine rotor 252 is now driven in the opposite direction.

In order to shift the guide vane structure 254 to control the direction of rotation of the turbine rotor 252, said structure is provided with gearing consisting of a rack 432 and a pinion 434. The flexible cable 312 from the control mechanism 296 is connected to the pinion 434, whereupon on rotation of the cable 312 as the control lever 290 is rotated from one limiting position to the other of its dead zone, the guide vane structure 254 is shifted from a position in which one of its guide vane sets 426 or 428 is aligned with the rotor vanes 422 to a position in which the other set of guide vanes is aligned with said rotor vanes. In this way rotation of the control lever in one or the other direction controls the direction of rotation of the turbine rotor.

Other means may be provided for controlling the direction of rotation of the turbine rotor. For example, instead of two sets of guide vanes, a single set of such vanes could be provided but in which the vanes themselves could be swung from a position such as shown for the vanes 426 to a position such as shown for the vanes 428.

Instead of making the turbine rotor 252 reversible, it is within the scope of the invention to drivably connect the turbine rotor to the drum members 30 through any conventional reversible gearing which is shiftable for rotation of its output shaft in forward or reverse directions. If such reversible gearing is used, the motion of the control member 290 in its dead zone range is used for shifting the gearing between its forward and reverse conditions.

As in the case of the auxiliary drive system of FIG. 5, the system of FIG. 7 preferably is used in the manner illustrated in FIG. 6. That is, at least two auxiliary drive systems of FIG. 7 would be provided, one on each side of the aircraft. The turbine motor 60a and its friction drive drums 30 of each such aircraft auxiliary drive system is provided with its own control lever 290 located in the aircraft. As discussed in connection with FIG. 6, this makes it possible to independently control the direction and magnitude of the power applied to the landing gear wheels associated with each motor 60a. However, a single auxiliary power unit 200 and air compressor 202 preferably supplies the compressed air to the burners 204 for each of the auxiliary turbine motors 60a.

The auxiliary drive system of FIG. 7 has been described in connection with the application to an aircraft for ground taxiing operations. However, because of its light weight and the power available from such a system, it is also within the scope of this invention to utilize such a system as a drive system for automotive vehicles designed for ground operation, either on or off highways. As in the case of the aircraft applications described, preferably two or more wheels on opposite sides of the automotive ground vehicle would each be provided with its own such drive system, of the type as illustrated in FIG. 7.

It is desirable to employ drum members 30 having as small a diameter as possible to minimize the space and weight requirements of these members and that of the associated gearing. For transmission of a given tractive effort by the drum members 30 to the wheels 20, the required pressure of the drum embers against the pneumatic tires of the wheels is determined by the coefficient of friction between said members and tires. Thus, if the diameter of the drum members 30 is decreased, then the indentation in the tires of the wheels 20 caused by a given pressure of these drum members against the tires increases and in addition the radius of each such indentation decreases. If the indentation is too deep and too sharp it may cause damage to the tires. For this reason the diameter of the drum members cannot be made too small. The invention, however, is not limited to any particular diameter for the drum members since the possibility of damage to the tires not only depends on the diameter of the drum members but also on the type of tire used and the magnitude of the tractive effect desired. For example, in the case of a Boeing 727 type aircraft the drum members 30 may have a diameter of approximately 4 inches or approximately one-tenth the diameter of the tires.

The hydraulic actuator 46 or 46a is designed to urge the drum members 30 against the tires of the landing gear wheels 20 with a pressure sufficient to prevent or minimize slippage of the members under the desired tractive effort and under normal operational conditions. However, the tires of wheels 20 could become coated with oil or some other substance such as to materially reduce the coefficient of friction between the tires and the drum members. If this should happen, the drum members 30 might slip on the tires of the landing gear wheels 20 thereby causing excessive wear of the tires and possibly even causing sufficient heat to cause material local damage to the tires.

Since the drum members 30 drive the wheels 20 through friction contact with the wheel tires, the tire surface when so driven will move at a slower peripheral speed than that of the drum members. That is, there inherently will be some slip or creep between the drum members 30 and tires of the wheels 20. With a given coefficient of friction between said drum members and tires (which for example may be about 0.5 under normal conditions), this slippage will increase approximately linearly with load until gross slippage occurs, which could damage the tires.

For the foregoing reasons, slip responsive means have been provided (one for each drum member 30) to provide a signal to vary the engaging contact pressure of the drum members 30 against the landing gear wheels automatically to just meet the tractive requirement of the moment up to a predetermined maximum contact pressure and to disengage the drum members 30 from the wheels 20 in the event the requirement exceeds (e.g., because of oil on the tires) the tractive capability provided by the predetermined maximum contact pressure before slippage of the drum members on the wheel tires could severely abrade and damage the tires. One form of such slip responsive means shown in FIGS. 15, 16, 17, is described in connection with the overall system of FIG. 7. It will be apparent, however, that such slip responsive means could also be used with the system of FIG. 5.

Referring now to FIGS. 15–17, a slip responsive means 440 comprises a roller 441 which is arranged to be driven at a speed proportional to that of its associated drum member 30. For this purpose the roller 441 is mounted on a shaft 442 for rotation therewith and this shaft is connected to a shaft 444 through a flexible connection 446 which is illustrated as a universal joint. The shaft 444 is suitably drivably connected to the drive connection for the associated drum member 30 (or to its shaft 62), for rotation at a speed proportional to said drum member. The shaft 442 has axial splines 448 and the roller 441 has mating splines which preferably are of a substantially frictionless type and which, for example, may comprise endless series of bearing type balls 450 to permit suitable frictionless axial movement of the roller 441 along the splines 448. Such a ball bearing type spline connection is conventional.

The roller 441 is arranged for rolling contact with a surface of revolution 452 over a range of diameters and which is illustrated in the form of a flat plate. The plate 452 is secured to a shaft 454 which is arranged to be driven at a speed proportional to the peripheral speed of the tread surface of the tires of the landing gear wheel 20 engaged by the drum member 30 to which the roller 441 is drivably connected. For this purpose, an auxiliary roller (not shown), connected to the shaft 454, is supported in contact with the tires of the wheels 20 so as to be driven thereby at all times when the drum 30 is in contact therewith.

The end of the shaft 442 is rotatably received in a crosshead 456 which has limited lateral motion in a bearing block 457. The bearing block 457 is connected to piston 458 received within a cylinder 460. Hydraulic pressure applied to the cylinder 460 through a line 462 serves to urge the roller 441 lightly against the plate 452. As illustrated in FIGS. 15 and 16, the crosshead 456 has limited side clearances 464 within its bearing block 457 to permit the axis of the shaft 442 to swing a limited amount laterally to either side of the plane including the axes of the shafts 444 and 454.

The drive ratios and directions of rotation of the shafts 444 and 454 are such that at no-slip between the associated drum member 30 and the tire of its landing gear wheels, the peripheral speed of the roller 441 and the peripheral speed of the circle 468 on the plate 452 contacted by the roller, are the same in direction (at point of contact) and magnitude. Also at this time the axis of the roller 441 intersects the axis of the plate 452 so that the crosshead 456 is in its central position as illustrated in FIGS. 15 and 16.

When, as a result of slip, the speed of the roller 441 increases, and with the assumed directions of rotation indicated in FIG. 17, the roller 441 moves across the plate 452 (upwardly as viewed in FIGS. 15 and 17) to cause the roller shaft 442 to tilt (upwardly relative to the axis of the shaft 444 as indicated in FIG. 17) up to the limit of its crosshead clearance 464. As shown by the arrow 469, the direction of motion of the point on the plate 452 now in contact with the roller 441 makes an acute angle to the roller shaft 442 thereby producing a force on the roller 441 which has a component urging the roller (to the right as viewed in FIGS. 15 and 17) along its shaft 442 toward the periphery of the plate 452. The roller 441 thereupon slides along its shaft 442 on its shaft splines 450 until its rolling contact circle on the plate 452 has a peripheral speed which equals that of the increased peripheral speed of the roller 441. At this point the roller 441 thereupon returns to its central position in which its axis intersects the axis of the plate 452. It is apparent therefore that this motion of the roller 441 to the right along its shaft 442 from its contact circle 468 at zero slip is proportional to the magnitude of the slip.

If the slip between the drum member 30 and its landing gear wheel decreases, the roller shaft 442 will tilt oppositely (downwardly as viewed in FIG. 17) from that described above and the roller 441 will now move to the left along its shaft 442 until its point of contact on the plate 452 is once again moving at the same speed as the periphery of said roller.

If the aircraft is being moved in the opposite direction, the direction of rotation of the roller 441 and plate 452 will be reversed. However, it can readily be seen that movement of the roller 444 along its shaft 442 will be the same as described above, namely, that when the slip increases, the roller 441 will move to the right along its shaft 442 (as viewed in FIGS. 15 and 17) to an extent dependent on the magnitude of the slip and will move to the left when the slip decreases.

A follower member 470 is movable to the right by the roller 441 as it moves in that direction along its shaft 442. This follower member 470 has an enlarged end 472 which is urged to the left (FIG. 15) against a fixed stop 474 by a spring 476. In this position the tip of the follower 470 bears on the side of the roller 441 when it is positioned to roll on the circle 468 of the plate 452 corresponding to the no-slip condition of the drum 30. As already described when slip develops, the roller 441 moves to the right, to an extent dependent on the magnitude of the slip, thereby correspondingly compressing the spring 476.

The other end of the spring 476 acts against a piston 478 slidable in a cylinder 480 to which hydraulic fluid is supplied from the line 482 through a restriction 484. Movement of the piston 478 by the spring 476 serves to control a drain port 486. In this way as the roller 441 moves to the right it compresses the spring 476 to cause the piston 478 to move to the right to an extent such that the hydraulic pressure behind the piston in the cylinder 480 increases to the point where it balances the increased pressure of spring 476. Hence, the hydraulic pressure in the cylinder 480 acting on the piston 478 is a measure of the motion of the roller 441 from its position for zero slip and therefore is a measure of the slip between the drum member 30 and the tire of its landing gear wheel. This pressure is supplied through a line 488 for controlling the contact pressure between the drum member 30 and its landing gear wheel.

Since each companion pair of drum members 30 preferably are connected to their turbine motor 60a through a differential gear 262 (as shown in FIG. 7) it is possible for the drum members 30 of each pair to rotate at different speeds. In fact, one of the drum members of such a pair may slip excessively while the other one does not. As already stated, each drum member 30 will have its own slip responsive means 440 and, therefore, will have its own pressure line 488 providing a pressure proportional to its slip. Thus, FIG. 15 shows a second such pressure line designated 488a coming from an identical second slip responsive means 440a (not shown) for the companion drum member 30. The two lines 488 and 488a are connected to a shuttle valve 490 having an output line 492. The valve is arranged to shift one way or the other depending on whether the pressure in the line 488 or 488a is higher so as to admit the higher pressure to its output line 492. The output line 492 from the shuttle valve 490 is connected, for example, to the supply line 270 (FIG. 7) for the hydraulic actuator control valve 272 to control the force exerted by the hydraulic actuator 46a urging the two companion drum members 30 into contact with their landing gear wheels 20.

With the structure of the slip responsive means 440 described, the force supplied by the hydraulic actuator 46a (FIG. 7) increases and decreases in accordance with the slip of the associated drum members 30 and if one of the drum members is slipping more than the other then because of the shuttle valve arrangement 490, the force supplied by the actuator 46a increases and decreases in accordance with the slip of the drum member 30 having the greatest slip. As previously noted for a given coefficient of friction between the drum members 30 and their landing wheels this slip is a measure of the torque load transmitted. In this way the contact pressure of a pair of companion drum members against their landing gear wheels is automatically controlled according to the tractive requirement of the moment. The invention also contemplates the optional provision of an indicator 494 located in the aircraft, connected to the line 492 to provide a visual indication to the pilot or other personnel of the aircraft, of the magnitude of the maximum slip of its associated drum members 30.

At this point it should be reiterated that the sliding movement of the roller 441 along its shaft 442 with changes in the slip of the associated drum member 30 is the same regardless of the direction of rotation of said drum member, that is, regardless of whether the control lever 290 (FIG. 6) is set for forawrd or reverse power operation.

Obviously, instead of using the hydraulic pressure directly from the line 492 to the control valve 272 (FIG. 7), this pressure could be used to control a servo valve which in turn would vary the supply pressure to the control valve 272.

When the slip of a drum member 30 reaches a predetermined value (for example 10–15 percent) the end 472 of the roller follower 470 engages the button of a switch 496 to close this switch which is connected by line 498 to the safety release solenoid 378 illustrated in FIGS. 11 and 12. Accordingly when an overslip condition occurs at the drum member 30 the switch 496 is closed to energize the solenoid 378 thereby retracting the solenoid latch 374. Thereupon the shaft member 364 moves to its extreme rightward position to close the air valve 208 to shut down the turbine 60a thereby preventing damage to the tires of the wheels 20 because of the over-slipping condition. At the same time the switch 394 (FIGS. 11 and 12) is also opened as a result of the release of the latch 374 and movement of the shaft member 364 to its extreme rightward position whereupon the hydraulic valve 272 closes and therefore the actuator spring 48a becomes effective to withdraw the drum members 30 from contact with the wheels 20.

Damage to the drive system and/or tire can result if a drum 30 is inadvertently engaged while its associated landing gear wheel is rotating in the opposite direction from the drum drive direction as determined by the control lever 290 or its engaged (or left engaged) while the wheels are rotating at a speed greater than that corresponding to the desired (or acceptable) speed of the drum 30. In the event of either of these occurrences, the roller 441 will shift towards a "negative slip3[ position — i.e., to the left of the no-slip circle 468. A switch 499 (supported by a fixed structure) is closed by its button 497 upon movement of roller 441 in this direction beyond the circle 468. This switch 499 is also connected by line 498 to the safety release solenoid 378 illustrated in FIGS. 11 and 12 which disengages drums 30 and shuts down the turbine 60a as in the event of an over-slip.

Although the slip responsive means 440 has been described in connection with the auxiliary drive system of FIG. 7 it obviously is also applicable to the system of FIG. 5.

The actuator 46 or 46a so far described is a simple form of such an actuator for moving the drum members 30 into and out of engagement with its landing gear wheels 20. Preferably each such actuator is also provided with means for releaseably locking the drum members 30 out from engagement with the wheels 20 and for damping vibrations. An actuator having these added functions is illustrated in FIG. 18. For convenience, this actuator has been described in connection with the system of FIG. 7. As will be apparent, however, the actuators 46 of FIG. 5 could also be so modified.

In FIG. 18 an actuator 500 comprises a cylinder 502 in which a hollow piston 504 is slidable. A piston rod 506 extends from the hollow piston 504 and has a small piston 508 slidably fitted within the hollow piston. Springs 510 serve to center the small piston 508 within the hollow piston 504. The piston rod 506 extends from one end of the cylinder 502 and is connected to the associated drum members 30 and the other end of the cylinder 502 is arranged for connection to the landing gear preferably in essentially the manner shown in FIGS. 1, 2, 5 and 7 in connection with each actuator 46 or 46a.

The actuator 500 requires hydraulic pressure for actuation in both directions rather than only in one direction with a spring return as in the case of the actuator 46 or 46a. For this reason the control valve 512 for the actuator 500 differs slightly from the control valve 272 (FIG. 7) for its actuator 46a. As illustrated, the control valve 512 comprises a movable valve spool element 514 and has a hydraulic supply passage 516, drain passages 518 at the two ends of the valve spool and output passages 520 and 522 connected to opposite ends of the actuator cylinder 502.

The valve 512 also includes a solenoid 524 corresponding to the solenoid 280 of FIG. 7. When the solenoid is energized the valve spool 514 moves to the right to the position illustrated and when the solenoid is de-energized a spring 526 moves the valve spool to its extreme lefthand position.

In the position illustrated in FIG. 18, the solenoid 524 is energized and hydraulic pressure is admitted from the supply passage 516 through the line 520 to the lefthand of the cylinder 502 so as to move the hollow piston 504 to the right to engage the associated drum members 30 with the wheels 20. The hollow piston applies a sufficient force to hold the drum members 30 against their wheels 20 so that the contact pressure therebetween is sufficient to transmit the tractive effort to said wheels. At this time the other or right end of the cylinder 502 is vented through the passage 522.

When the solenoid 524 is de-energized, the spring 526 moves the valve spool 514 to the left whereupon the passage 520 is vented and hydraulic pressure is applied through the line 522 to the right end of the cylinder 502. Accordingly, the hollow piston 504 now moves to the left. As the piston 504 approaches the end of this leftward stroke, an inclined face 530 at the end of an extension of this piston forces a small plunger-type latch 532 to retract radially outward from its extended position shown against a compression spring 533. Then as the hollow piston completes its stroke the latch 532 snaps back to its extended position into an annular groove 534 on the extension of the piston 504 to hold the piston in this position in which the drum members 30 are now retracted from the wheels 20 sufficiently to provide adequate clearance therebetween. At this time the hydraulic pressure applied to the piston 504 from the line 522 can be relieved since the spring 533 will serve to maintain the latch 532 in engagement within the notch 534 thereby effectively holding the hollow piston 504 in its retracted position in which the drum members 30 are out of engagement with their wheels 20.

When the solenoid valve 512 is again energized, the line 522 is now vented and at the same time hydraulic pressure is applied to the line 520 to urge the hollow piston 504 to the right. This pressure is effective against the latch 532 to retract against spring 533. For this purpose a small clearance 536 is provided to facilitate the application of hydraulic pressure to the head of the latch 532 and the rear of the latch is vented at 537. Upon retraction of the latch 532 the hydraulic pressure from the line 520 is effective to move the piston 504 to the right to again engage the drum members 30 with the wheels 20.

Because of the hollow construction of the piston 504 with its small internal piston 508 and centering springs 510, the drum members 30 are vibrationally isolated from the acceleration and vibration forces imposed on the landing gear as, for example, when the aircraft is landing or as a result of chatter produced by application of the landing wheel brakes. In other words, the springs 510 provide a resilient connection for resiliently holding the drum members 30 against the landing wheels 20. The hollow piston is filled with hydraulic fluid. A restrictive passage 538 connects the opposite sides of the internal piston 508 whereupon any vibratory movements of the drum members 30 relative to the landing gear results in corresponding movements of the small piston 508 in the hollow piston which requires hydraulic fluid flow through the restrictive passage 538. Accordingly, the small piston 508 with its restrictive passage 538 serves to damp any vibrations of the drum members 30.

It is recognized that notwithstanding the vibration isolating and damping provisions provided by the structure shown in FIG. 18, the auxiliary drive turbine motors 60 or 60a will be subject to vibration and acceleration forces as the aircraft moves along the ground. In order to improve the durability of the auxiliary drive motors, instead of mounting these motors at the lower end of their landing gear, as in FIGS. 1, 2, 5 and 7, they may be mounted within the aircraft or on the upper end of the aircraft landing gears and connected to the drum members 30 through flexible connections. Such an arrangement is illustrated in FIGS. 19 and 20 in which the invention is applied to a four wheel landing gear 600 having two tandem disposed pairs of wheels 602 and 604. This arrangement of FIGS. 19 and 20 obviously could also be applied to other types of landing gear, for example, a two wheel as shown in FIGS. 1 and 2. Since hydraulic type motors 60 in general probably would be more rugged than turbine type 60a, the arrangement of FIGS. 19 and 20 will be described in connection with such a turbine type motor. It will be apparent, however, that the hydraulic type motor could also be mounted within the aircraft in FIGS. 19 and 20.

In FIGS. 19 and 20 the landing gear comprises a telescopic strut including an upper part 606 and a lower part 608 telescopically extending into the upper part. The telescopic struts 606 and 608 of the landing gear are interconnected by the usual scissor type linkage 610 and 612. The lower part 608 of the telescopic strut has a horizontal arm 614 connected thereto by pin 613 to form an inverted T shape to which the two side-by-side pairs of landing gear wheels 602 and 604 are journaled on opposite sides of the arm 614. The upper part of the upper telescopic part 606 of the landing gear strut is secured to a substantially horizontal shaft 615 journaled within the aircraft. The landing gear is arranged for retraction within the aircraft by a pivotal motion about the axis of the shaft 615. The telescopic strut of the landing gear of FIGS. 19 and 20 so far discussed is conventional.

Two drum members 616 are arranged for frictional driving engagement with the tires of the landing gear wheels 602. The drum members 616 are journaled in a housing structure 618 preferably in a manner similar to that shown in FIG. 4. The housing 618 has an arm 620 pivotally connected at 622 to the scissor link 612 such that as in FIGS. 1 and 2, the tangent to the point of contact of the drum members 616 with the landing wheels 602 passes through the axis of the pivotal connection 622.

An actuator or hydraulic motor 624 preferably similar to the actuator illustrated in FIG. 18 has one end pivotally connected to the housing 618 and has its other end pivotally connected to the lower arm 614 of the landing gear for holding the drums 616 in engagement with the wheels 602 or out from engagement with said wheels depending on whether hydraulic pressure is applied to line 626 or 628 of its two hydraulic connections.

The housing structure 618 includes a bevel gear 630 journaled therein and drivably connected through a differential (not shown) to each of the drums 616. A driving shaft 632 extends into the housing 618 and has a small bevel pinion 634 inside the housing 618 meshing with the bevel gear 630 for driving the drum members 616. The other end of the shaft 632 is connected to one side of a universal joint 640. The other side of the universal joint 640 is connected to a shaft 642 which telescopically extends into a hollow shaft 644. The shaft 642 has external axial splines 646 meshing with the internal axial splines 648 on the hollow shaft 644. The hollow shaft 644 is connected to one side of a second universal joint 650. The other side of the universal joint 650 is connected to the output shaft 652 of the reduction gear 654 driven by a turbine 656. The turbine 656 includes a burner unit 658 to which compressed air is supplied by a compressor through a pipe 660. The turbine also includes a discharge duct 662 to direct and muffle the discharge gases.

The turbine 656 and its reduction gear 654 and burner unit 662 are supported by the shaft 615 so as to rotate therewith when the landing gear is retracted. The telescopic connection between the drive shafts 642 and 644 maintains a driving connection between the turbine 656 and the drum members 616 as the landing gear is retracted notwithstanding the relative telescopic extension of the two landing gear struts 606 and 608 at the time of such landing gear retraction as compared to the relative telescopic retraction of such struts when the aircraft is resting on the landing gear. The two universal joints 640 and 650 also permit slight misalignment of the two shafts 632 and 652 when the drum members 616 are being driven and also permit misalignment when the landing is being retracted.

The auxiliary drive shown in FIGS. 19 and 20 for the landing gear wheels obviously can be controlled and operated in essentially the same manner as that described in connection with the auxiliary drive for the system of FIG. 7.

While we have described our invention in detail in its present preferred embodiments, it will be obvious to those skilled in the art, after understanding our invention, that various changes and modifications may be made therein without departing from the spirit or scope thereof. We aim, in the appended claims, to cover all such modifications.

I claim:

1. In an aircraft having a landing gear extendible and retractable therefrom and including a shock-absorbing strut having a pair of telescopic members and including a landing wheel at its outer end for contact with the ground when the aircraft is being taxiied along the ground; the combination comprising
    a. drum means having a small diameter compared to that of said wheel and movable into and out of friction driving engagement with said wheel,
    b. an auxiliary motor for driving said drum means,
    c. means drivably connecting said motor to said drum means,
    d. means manually operable from within the aircraft when the landing gear is extended for moving said drum means into driving engagement with said wheel and for regulating the power output of said motor,
    e. means for supporting said drum means on said landing gear so as to permit telescopic movements of said landing gear strut while said drum means is in driving engagement with said wheel and to permit retraction of the landing gear with said drum means while said drum means is out of engagement with said wheel.

2. In an aircraft as recited in claim 1 in which
    a. said landing gear includes a pair of links, one for each of said telescopic strut members with said links being pivotally connected to their respective strut members and being pivotally connected together at a point spaced from their connections to said strut members, and
    b. said drum supporting means comprises a pivotal connection to at least one of said links.

3. In an aircraft as recited in claim 1 in which said supporting means also supports said auxiliary motor so that both said drum means and auxiliary motor are retracted with the landing gear.

4. In an aircraft as recited in claim 3 in which said supporting means also includes means for minimizing the transmission of vibrations from said landing gear to said drum means and auxiliary motor.

5. In an aircraft as recited in claim 1 in which
    a. said landing gear also includes a pair of links, one for each of said telescopic strut members with said links being pivotally connected to their respective strut members and being pivotally connected together at a point spaced from their connections to said strut members,
    b. said auxiliary motor and drum means are mounted on a common structure, and
    c. said supporting means comprises a pivotal connection between at least one of said links and said common structure.

6. In an aircraft as recited in claim 1 in which the auxiliary motor is supported within the aircraft adjacent to the upper end of the landing gear and in which said driving connection from said motor to said drum means is flexible so as to accommodate extension movements of the telescopic landing gear strut.

7. In an aircraft as recited in claim 1 and including means for releaseably locking said drum means out from engagement with said landing wheel.

8. In an aircraft as recited in claim 1 in which
    a. said drum supporting means includes a support structure on which said drum means is journaled for rotation and also
    b. includes a pivotal connection to said support structure disposed so that said drum means can be rotated about the axis of said pivotal connection to bring the drum means in driving engagement with said wheel, the axis of said pivotal connection being disposed so that when the drum means is in driving engagement with the wheel a tangent to the point of engagement of said drum means with said wheel substantially intersects said pivot axis.

9. In an aircraft as recited in claim 1 in which said manually operable means comprises a member operable for controlling both the direction of rotation and the power output of said auxiliary motor.

10. In an aircraft as recited in claim 1 in which said manually operable means includes a member movable for controlling the engagement of said drum means with said wheel and for controlling both the direction of rotation and the power output of said auxiliary motor such that said engagement occurs when said power output is at the low end of its power range.

11. In an aircraft as recited in claim 10 in which said manually movable member has a neutral position and is movable for a limited range in either direction from said neutral position for controlling the direction of rotation of said motor and is further movable in either direction beyond said range for determining the power output of said motor.

12. In an aircraft as recited in claim 1 and including means for automatically reducing the power output of said motor should slippage between said drum means and said wheel exceed a predetermined value.

13. In an aircraft as recited in claim 1 and including means for automatically increasing and decreasing the contact pressure between said drum means and said wheel in accordance with increase and decrease respectively in the tractive effort being transmitted by said drum means to said wheel.

14. In an aircraft as recited in claim 1 and including an instrument within the aircraft for indicating the magnitude of the tractive effort being transmitted by said drum means to said wheel.

15. In an aircraft as recited in claim 1 in which
    a. said aircraft landing gear includes a pair of spaced side-by-side landing wheels disposed on opposite sides of the telescopic strut of said landing gear and
    b. said drum means includes a pair of co-axial drum members, one for each of said wheels and supported from said telescopic strut.

16. In an aircraft as recited in claim 15 in which the supporting means for said pair of drum members includes means permitting the axis of said drum members to tilt laterally to accommodate a pair of landing wheels of slightly different diameter.

17. In an aircraft as recited in claim 15 in which
 a. said landing gear includes a pair of links, one for each of said telescopic strut members with said links being pivotally connected to their respective strut members and being pivotally connected together at a point spaced from their connections to said strut members, and
 b. said drum supporting means includes a frame structure having a portion extending into each drum member on which said drum member is journaled and includes a pivotal connection between said frame structure and at least one of said links.

18. In an aircraft as recited in claim 15 in which said drum supporting means includes a frame member on which said pair of drum members are journaled for rotation and also includes a first link having one end pivotally connected to said strut and its other end connected to said frame member at two points spaced apart generally in a direction parallel to the axis of said drum members, one of the pivotal connections including a second link pivotally interconnected between said frame member and said first link and in which said pivotal connections have at least limited angular flexibility.

19. In an aircraft as recited in claim 15 in which said auxiliary motor is positioned between the planes of rotation of said landing wheels and is supported from said strut along with the drum members.

20. In an aircraft as recited in claim 15 in which said auxiliary motor comprises a positive-displacement hydraulic motor.

21. In an aircraft as recited in claim 20 in which said auxiliary hydraulic motor includes means for varying its displacement per motor revolution and in which means are provided for decreasing said displacement if the pressure of the hydraulic fluid supplied to the motor should decrease.

22. In an aircraft as recited in claim 20 and including means for reversing the direction of rotation of said auxiliary hydraulic motor and in which said manually operable means also controls the direction of rotation of said hydraulic motor.

23. In an aircraft as recited in claim 15 and in which said auxiliary motor comprises a gas turbine and is supported from said strut along with the drum members.

24. In an aircraft as recited in claim 23 in which said auxiliary motor also includes a combustion unit also supported from said strut for supplying said turbine with combustion gases for driving the turbine.

25. In an aircraft as recited in claim 23 in which said turbine includes means for reversing its direction of rotation.

26. In an aircraft as recited in claim 25 in which said turbine includes adjustable guide vane means for reversing its direction of rotation and in which said manually operable means also controls said direction of rotation of said turbine.

27. In an aircraft as recited in claim 15 in which
 a. said supporting means includes a frame structure supported from said telescopic strut and having portions extending into said drum members, with said drum members being journaled on said frame member extensions, and
 b. the driving connection from said motor to each of said drum members includes a drive shaft extending through the associated frame extension and being drivably connected to said drum member at the end of said drum member remote from the other drum member.

28. In an aircraft as recited in claim 15 and in which the driving connection to said drum members includes differential gearing to permit relative rotation of said drum members.

29. In an aircraft having first and second extendible and retractable landing gears disposed on opposite sides of the aircraft fuselage and each including a telescopic shock-absorbing strut and each having a pair of side-by-side landing wheels at and on opposite sides of the strut outer end for contact with the ground when the aircraft is taxiing along the ground; separate means for driving the pair of wheels of each of said two landing gears, each of said means for driving the pair of wheels of one of said landing gears, comprising
 a. a pair of co-axial drum members for said landing gear, one for each of its said landing gear wheels and being movable into and out of frictional engagement with said wheels,
 b. an auxiliary motor,
 c. means drivably connecting said auxiliary motor to said pair of drum members,
 d. a control member operable from within the aircraft when said landing gear is extended for moving said drum members into frictional driving engagement with its wheels and controlling the power output of said auxiliary motor such that said engagement occurs when said power output is at the low end of its power range, and
 e. means for supporting said drum members from said telescopic strut so as to permit telescopic extension and retraction of said strut while said drum members are in driving engagement with the wheels of said landing gear.

* * * * *

UNITED STATES PATENT OFFICE
CERTIFICATE OF CORRECTION

Patent No. 3,762,670     Dated October 2, 1973

Inventor(s) Charles W. Chillson

It is certified that error appears in the above-identified patent and that said Letters Patent are hereby corrected as shown below:

IN THE SPECIFICATION:

Column 10 - line 47 - change "liguid" to -- liquid
Column 13 - line 28 - change "shft" to -- shaft
Column 14 - line 41 - change "204" to -- 294
Column 17 - line 68 - change "embers" to - members
Column 21 - line 27 - change "forawrd" to -- forward
Column 21 - line 63 - change "negative slip 3[ position" to ---"negative slip" position
Column 23 - line 49 - change "isolating" to -- isolation Signed and sealed this 15th day of January 1974.

(SEAL)
Attest:

EDWARD M. FLETCHER, JR.          RENE D. TEGTMEYER
Attesting Officer                Acting Commissioner of Patents